United States Patent
Scherly et al.

(10) Patent No.: US 11,216,628 B2
(45) Date of Patent: Jan. 4, 2022

(54) HIGH-SPEED SCANNING OF OPTICAL PATTERNS USING A DIGITAL CAMERA

(71) Applicant: SCANDIT AG, Zurich (CH)

(72) Inventors: Daniel Scherly, Zurich (CH); Joan Domènech, Zurich (CH); Andrea Tullis, Thalwil (CH); Vitali Samurov, Tampere (FI); Christian Floerkemeier, Zurich (CH)

(73) Assignee: SCANDIT AG, Zurich (CH)

( * ) Notice: Subject to any disclaimer, the term of this patent is extended or adjusted under 35 U.S.C. 154(b) by 0 days.

(21) Appl. No.: 17/186,909

(22) Filed: Feb. 26, 2021

(65) Prior Publication Data

US 2021/0312151 A1    Oct. 7, 2021

Related U.S. Application Data

(63) Continuation-in-part of application No. 17/139,529, filed on Dec. 31, 2020, which is a continuation of application No. 16/920,061, filed on Jul. 2, 2020, now Pat. No. 10,963,658, application No. 17/186,909, which is a continuation-in-part of application No. 16/905,722, filed on Jun. 18, 2020, now Pat. No. 10,846,561, and a continuation-in-part of application No. 17/105,082, filed on Nov. 25, 2020, now Pat. No. 11,087,105.

(Continued)

(51) Int. Cl.
*G06K 7/14*    (2006.01)
*G06T 7/73*    (2017.01)

(52) U.S. Cl.
CPC ........ *G06K 7/1417* (2013.01); *G06K 7/1443* (2013.01); *G06K 7/1447* (2013.01); *G06T 7/73* (2017.01)

(58) Field of Classification Search
CPC .. G06K 7/1417; G06K 7/1447; G06K 7/1443; G06T 7/73
See application file for complete search history.

(56) References Cited

U.S. PATENT DOCUMENTS 4,167,756 A    9/1979    Smith
D344,261 S    2/1994    Watanabe
(Continued)

FOREIGN PATENT DOCUMENTS

EP    3167404 A1    5/2017
JP    2004032507 A    1/2004
(Continued)

OTHER PUBLICATIONS

Preinterview First Office Action dated Sep. 16, 2020 in U.S. Appl. No. 16/920,061, 6 pages.
(Continued)

*Primary Examiner* — Matthew Mikels
(74) *Attorney, Agent, or Firm* — Kilpatrick Townsend & Stockton LLP

(57) ABSTRACT

A digital camera in a mobile device, such as in a smart phone, can be used for super-fast scanning of optical codes. The camera uses a wide-angle lens, high frames per second, very short exposure time, and/or a torch. For example, an ultra-wide angle camera can be used to provide a wide field of view and a large depth of field while decoding multiple optical codes.

21 Claims, 14 Drawing Sheets

Related U.S. Application Data

(60) Provisional application No. 63/149,009, filed on Feb. 12, 2021, provisional application No. 63/044,635, filed on Jun. 26, 2020, provisional application No. 63/025,850, filed on May 15, 2020, provisional application No. 63/019,818, filed on May 4, 2020, provisional application No. 63/017,493, filed on Apr. 29, 2020, provisional application No. 63/003,675, filed on Apr. 1, 2020.

(56) References Cited

U.S. PATENT DOCUMENTS

| | | |
|---|---|---|
| 5,744,815 A | 4/1998 | Gurevich et al. |
| D473,872 S | 4/2003 | Ausems et al. |
| 6,580,453 B1 | 6/2003 | Hirasawa |
| D576,197 S | 9/2008 | Takagi |
| 7,457,407 B2 | 11/2008 | Sun et al. |
| D654,931 S | 2/2012 | Lemelman et al. |
| D658,174 S | 4/2012 | Tasselli et al. |
| D659,564 S | 5/2012 | Baxter |
| 8,223,203 B2 | 7/2012 | Ohsurri et al. |
| D667,823 S | 9/2012 | Merenda |
| D670,278 S | 11/2012 | Hamann |
| D672,386 S | 12/2012 | Matunuma et al. |
| D678,870 S | 3/2013 | Fathollahi |
| D678,936 S | 3/2013 | Oliver |
| D685,360 S | 7/2013 | Chen et al. |
| D688,654 S | 8/2013 | Stevinson |
| 8,596,540 B2 | 12/2013 | Adelmann |
| D698,772 S | 2/2014 | Merenda |
| D710,343 S | 8/2014 | Chandler, Jr. et al. |
| D710,346 S | 8/2014 | Smith et al. |
| 8,798,453 B2 | 8/2014 | Lawton |
| D716,285 S | 10/2014 | Chaney et al. |
| D716,785 S | 11/2014 | White |
| D717,287 S | 11/2014 | Macrina et al. |
| D717,304 S | 11/2014 | Yturralde et al. |
| D719,166 S | 12/2014 | Brow n et al. |
| D719,167 S | 12/2014 | Brow n et al. |
| D724,573 S | 3/2015 | Stevinson |
| D726,701 S | 4/2015 | Stevinson |
| 9,019,420 B2 | 4/2015 | Hurst et al. |
| D728,551 S | 5/2015 | Saeki et al. |
| D732,011 S | 6/2015 | Stevinson |
| D733,112 S | 6/2015 | Chaney et al. |
| D734,336 S | 7/2015 | Mistkaw i et al. |
| D744,470 S | 12/2015 | Stevinson |
| D748,085 S | 1/2016 | Merenda |
| D754,114 S | 4/2016 | Curtis et al. |
| D754,650 S | 4/2016 | Curtis et al. |
| D759,004 S | 6/2016 | Stevinson |
| D760,209 S | 6/2016 | Weng et al. |
| D760,212 S | 6/2016 | Mao et al. |
| D760,710 S | 7/2016 | Ozolins et al. |
| D761,240 S | 7/2016 | Ozolins et al. |
| D768,617 S | 10/2016 | Merenda |
| D771,631 S | 11/2016 | Fitch et al. |
| 9,654,675 B2 | 5/2017 | Kessler |
| 9,836,635 B2 | 12/2017 | Negro et al. |
| 10,191,242 B2 | 1/2019 | Palmeri |
| 10,229,301 B2 | 3/2019 | Cumoli et al. |
| D860,180 S | 9/2019 | Lehmann et al. |
| D862,441 S | 10/2019 | Eppler et al. |
| 10,426,442 B1 | 10/2019 | Schnorr |
| 10,452,959 B1 | 10/2019 | Gautam et al. |
| 10,818,014 B2 | 10/2020 | Xu et al. |
| 10,846,561 B1 | 11/2020 | Floerkemeier et al. |
| 10,963,658 B1 | 3/2021 | Bloch et al. |
| 2003/0059124 A1 | 3/2003 | Center, Jr. |
| 2006/0011724 A1 | 1/2006 | Joseph |
| 2006/0249581 A1 | 11/2006 | Smith |
| 2007/0116454 A1 | 5/2007 | Tsai |
| 2009/0002797 A1 | 1/2009 | Kw ong et al. |
| 2009/0033786 A1 | 2/2009 | Finkelstein et al. |
| 2009/0108071 A1 | 4/2009 | Carlson |
| 2009/0212113 A1 | 8/2009 | Chiu et al. |
| 2009/0304234 A1 | 12/2009 | Kondo et al. |
| 2010/0102129 A1 | 4/2010 | Drzymala et al. |
| 2010/0328420 A1 | 12/2010 | Roman |
| 2011/0007205 A1 | 1/2011 | Lee |
| 2011/0043683 A1 | 2/2011 | Beach et al. |
| 2011/0081946 A1 | 4/2011 | Singh |
| 2013/0076697 A1* | 3/2013 | Goertz ............... G06F 3/0425 345/175 |
| 2013/0112750 A1 | 5/2013 | Negro et al. |
| 2013/0206839 A1* | 8/2013 | Gao ............... G06K 7/10861 235/462.42 |
| 2013/0329115 A1 | 12/2013 | Palmeri |
| 2014/0171150 A1 | 6/2014 | Hurst et al. |
| 2014/0232930 A1 | 8/2014 | Anderson |
| 2014/0285913 A1 | 9/2014 | Palmeri |
| 2014/0327815 A1 | 11/2014 | Auger |
| 2015/0048167 A1 | 2/2015 | Russell et al. |
| 2015/0053765 A1 | 2/2015 | Pow ell et al. |
| 2015/0220766 A1 | 8/2015 | Russell et al. |
| 2016/0070944 A1 | 3/2016 | Mccloskey et al. |
| 2016/0077307 A1 | 3/2016 | Palmeri |
| 2016/0188941 A1 | 6/2016 | Todeschini et al. |
| 2016/0307006 A1 | 10/2016 | Wang |
| 2016/0321819 A1 | 11/2016 | Morgan-Mar et al. |
| 2016/0323508 A1 | 11/2016 | Ayalasomayajula et al. |
| 2017/0013179 A1 | 1/2017 | Kang et al. |
| 2017/0032311 A1 | 2/2017 | Rizzolo et al. |
| 2017/0041540 A1 | 2/2017 | Foster et al. |
| 2017/0243097 A1 | 8/2017 | Loy |
| 2018/0081417 A1 | 3/2018 | Chan et al. |
| 2018/0137319 A1 | 5/2018 | Giordano et al. |
| 2018/0157885 A1 | 6/2018 | Gurzumar |
| 2018/0342050 A1* | 11/2018 | Fitzgerald ............... G06T 7/13 |
| 2019/0188435 A1 | 6/2019 | Davis et al. |
| 2019/0244043 A1 | 8/2019 | Bradley et al. |
| 2019/0325183 A1 | 10/2019 | Tscherepanow et al. |
| 2020/0042803 A1 | 2/2020 | Yamaguchi |
| 2020/0084375 A1 | 3/2020 | Tadano et al. |
| 2021/0125141 A1 | 4/2021 | Lipsey |

FOREIGN PATENT DOCUMENTS

| | | |
|---|---|---|
| KR | 20020077090 A | 10/2002 |
| KR | 20060102957 A | 9/2006 |
| WO | 0131893 A1 | 5/2001 |
| WO | 2016007662 A1 | 1/2016 |
| WO | 2019135163 A2 | 7/2019 |

OTHER PUBLICATIONS

Basilico, "Flens—The first flashlight booster for smartphones", Kickstarter, retrieved on Mar. 18, 2021 from URL: https://www.kickstarter.com/projects/basilico/flens-the-first-flashlight-booster-for-smartphones, 5 pages.

"Code Reader 4405 User Manual", Code Product Line Version 03, Release date: Jan. 2016,. Code Corporation, Accessed on: Dec. 22, 2020 [Online], Retrieved from https://web.archive.org/web/20181223184651/http://www.codecorp.com/products.php?id=167, 16 pages.

"Flens—The First Flashlight Booster f or Smartphones", created by Basilico, Kickstarter, last updated Dec. 11, 2019, Accessed on Mar. 26, 2021 fromhttps://kickstarter.com/projects/basilico/flen-the-first-flashlight-booster-for-smartphones,26 pages.

"Linea Pro Extreme Rugged Case". Infinite Peripherals, iOS Accessories, Linea Pro and Infinea Tab Accessories,Retrieved on Dec. 22, 2020 from https://web.archive.org/web/20150825044354/http://ipcprint.com/linea-pro-extreme-rugged-case.html 3 page.

"Scandit Augmented Reality Retail Price Label Verification", Scandit, posted Sep. 26, 2018, retrieved on Aug. 4, 2020 fromhttps: //www.scandit.com/resources/videos/scandit-augmented-reality-retail-price-label-verification/ , 5 pages.

"Scandit Augmented Reality for Smart Devices", Scandit, posted Oct. 2, 2019, retrieved on Dec. 2, 2020 fromhttps://www.scandit.com/resourees/videos/scandit-augmented-reality-for-smart-devices/, 3 pages.

(56) References Cited

OTHER PUBLICATIONS

"Scandit Augmented Retail Product Information Using AR", Scandit, posted Sep. 26, 2018, retrieved on Dec. 2, 2020 fromhttps://www.scandit.com/resources/videos/scandit-augmentec-retail-product-information-using-ar/, 5 pages.

Scandit Augmented Reality Retail Click and Collect, Scandit, posted Sep. 26, 2018, retrieved on Dec. 2, 2020 fromhttps://www.scandit.com/resources/videos/scandit-augmented-reality-retail-click-and-collect/, 4 pages.

"Scandit Augmented Reality Retail Shelf Management", Scandit, posted Sep. 26, 2018, retrieved on Dec. 2, 2020 fromhttps://www.scandit.com/resources/videos/scandit-augmenttid-reality-retail-shelf-management/, 4 pages.

"Computer Vision and Augmented Reality for Enterprise Applications", Scandit, posted Jun. 6, 2018, retrieved on Dec. 2, 2020 fromhttps://www.scandit.com/resources/vidsos/computer-vision-and-augmented-reality-for-enterprise-applications/, 2 pages.

Brownlee; Jason, "Deep Learning Models for Human Activity Recognition", Deep Learning for Time Series, Navigation, last updated Aug. 5, 2019, 16 pages.

Invitation to Pay Additional Fees And, Where Applicable, Protest Fee, dated Jun. 17, 2021 in International Patent Application No. PCT/US2021/025212, 2 pages.

International Application No. PCT/US2021/025212 received an International Search Report and the Written Opinion dated Aug. 12, 2021, 11 pages.

U.S. Appl. No. 17/322,376 received a Non-Final Office Action dated Aug. 30, 2021, 12 pages.

U.S. Appl. No. 17/322,376 received a Notice of Allowance dated Sep. 24, 2021, 10 pages.

U.S. Appl. No. 17/186,898 received a Final Office Action dated Sep. 27, 2021, 10 pages.

\* cited by examiner

FIG. 11

HIGH-SPEED SCANNING OF OPTICAL PATTERNS USING A DIGITAL CAMERA

CROSS REFERENCE TO RELATED APPLICATIONS

This application claims priority to U.S. Provisional Application No. 63/149,009, filed on Feb. 12, 2021, which is incorporated by reference for all purposes. This application is a continuation-in-part of U.S. Non-Provisional application Ser. No. 17/139,529, filed on Dec. 31, 2020, which is a continuation of U.S. Non-Provisional application Ser. No. 16/920,061, filed on Jul. 2, 2020, which claims the benefit of priority of U.S. Provisional Application No. 63/017,493, filed on Apr. 29, 2020, 63/003,675, filed on Apr. 1, 2020, and 63/019,818, filed on May 4, 2020, which are incorporated by reference for all purposes. This application a continuation-in-part of U.S. patent application Ser. No. 16/905,722, filed on Jun. 18, 2020, now U.S. Pat. No. 10,846,561, issued Nov. 24, 2020, which is incorporated by reference for all purposes. This application claims priority to U.S. Provisional Application No. 63/025,850, filed on May 15, 2020, which is incorporated by reference for all purposes. This application a continuation-in-part of U.S. patent application Ser. No. 17/105,082, filed on Nov. 25, 2020, which claims the benefit of priority of U.S. Provisional Application No. 63/044,635, filed on Jun. 26, 2020, which are incorporated by reference for all purposes.

BACKGROUND

This disclosure generally relates to decoding optical codes, and more specifically, and without limitation, to decoding barcodes. Barcodes have traditionally been scanned using a specialized scanner. For example, a barcode scanner comprising a laser is used to shine coherent light on a barcode, and reflected light from the barcode is detected and used to decode the barcode. As mobile devices (e.g., smartphones and tablets) with cameras have become more common, mobile devices are being used to decode codes by acquiring an image of a code and using image analysis to decode the code. An example of a method for using a smartphone to decode a barcode is provided in U.S. Pat. No. 8,596,540, granted on Dec. 3, 2013.

BRIEF SUMMARY

This disclosure generally relates detecting optical patterns and decoding optical codes (e.g., barcodes; QR codes). For example, a barcode can be a Stock Keeping Code (SKU) in a retail setting. In some configurations, systems and/or processes described herein can be used to quickly identify and decode optical codes.

In certain embodiments, an apparatus for decoding optical patterns, the apparatus comprising: a camera comprising an image sensor and a lens configured to focus light on the image sensor, wherein the lens is a wide-angle lens; and one or more processors configured to: acquire a plurality of images using the camera; analyze the plurality of images to detect an optical pattern in the plurality of images; decode the optical pattern to obtain a data payload; and/or save the data payload in a memory device of the apparatus, wherein: the lens is set at a fixed focus during acquisition of the plurality of images, an exposure time for each of the plurality of images is equal to or less than one five-hundredth of a second, the plurality of images are acquired at a frame rate of the camera, and/or the frame rate is equal to or greater than thirty frames per second.

In certain embodiments, a method for decoding optical patterns comprises: acquiring a plurality of images using a camera, analyzing the plurality of images to detect an optical pattern in the plurality of images; decoding the optical pattern to obtain a data payload; and/or saving the data payload to a memory device, wherein: a lens of the camera is set at a fixed focus during acquisition of the plurality of images, the lens of the camera is a wide-angle lens, an exposure time for each of the plurality of images is equal to or less than one five-hundredth of a second, the plurality of images are acquired at a frame rate of the camera, and/or the frame rate is equal to or greater than thirty frames per second.

In certain embodiments, an apparatus comprises an attachment for a mobile device having a torch and a camera with a first lens, the apparatus comprising a second lens and/or a third lens, wherein: the attachment is configured to be removably coupled with the mobile device; the second lens is configured to increase an angle of view of the camera of the mobile device, while the attachment is coupled with the mobile device; and/or the third lens is configured to focus light of the torch, while the attachment is coupled with the mobile device. In some embodiments, the third lens is configured to focus light of the torch in a direction normal from the torch; the third lens is configured to focus light of the torch into an ellipse shape, wherein the ellipse shape is non-circular; the attachment is a case that covers at least a portion of two or more sides of the mobile device; and/or the attachment further comprising a magnet.

In certain embodiments, a method comprises using a torch of the mobile device for aiming the mobile device at an optical pattern.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

FIG. 11 is an embodiment of a shelf diagram with a visual image of the shelf.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Matrix Scan

Many applications are becoming web-based. However, web-based applications can have less computational resources than a native application. For example, a native application can be used to track barcodes based on decoding barcodes from a plurality of images. However, decoding barcodes can be computationally intense and cause lag when moved to a web-based application. Thus, in some embodiments, barcodes are tracked in several frames but decoded only periodically for a web-based application used to decode barcodes. In some embodiments, a frame is one of a series of separate photographs that make up a film or video.

Figure 1:
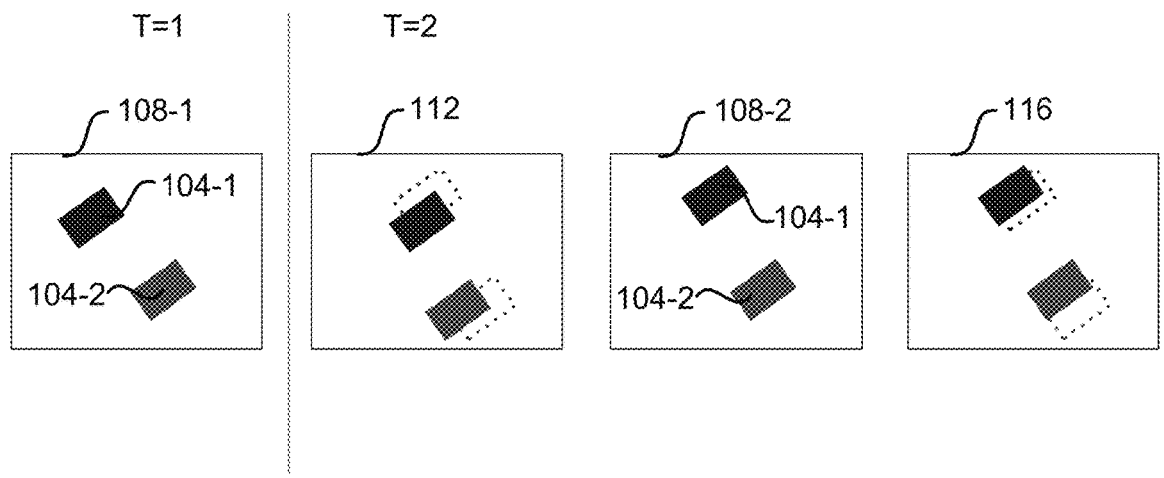
FIG. 1 depicts an embodiment of a tracking methodology.

Referring first to FIG. 1, an embodiment of a tracking scheme is depicted. This tracking scheme can be used on a native application. In FIG. 1, a first code 104-1 and a second code 104-2 are decoded in a first frame 108-1 (e.g., initialization) at time T=1, and positions of the first code 104-1 and the second code 104-2 are ascertained. The first frame 108-1 corresponds to a first image acquired by an image sensor (e.g., from a camera in a mobile device). The code 104 is an optical pattern. The code 104 can be a machine-readable code, such as a one-dimensional bar code having a plurality of horizontal lines or a two-dimensional barcode (e.g., a QR code), symbol(s) (e.g., dollar sign, triangle, etc.), number(s), and/or letter(s). For example, a code 104 can be a price, a VIN number to identify a vehicle, a credit card number, a license plate number, a serial number, a tire code (TIN), or a date (e.g., an expiry date). The code 104 be in various environments and/or uses. For example, the code 104 can be part of or on a shipping label, a product label, a passport, a shipping invoice, a driver's license, an ID card, a credit card, a check, a license plate, a digital display (e.g. an electronic price label), a utility meter, ID docs with a Machine Readable Zone (MRZ), or a retail receipt.

At time T=2, a prediction 112 is calculated (e.g., assuming smooth motion of the mobile device); codes 104 are decoded in a second frame 108-2 (wherein the second frame 108-2 corresponds to a second image acquired by the image sensor); the codes 104 are matched with the prediction 112; and an updated position 116 of codes 104 is ascertained based on codes 104 decoded from the second frame 108-2.

Some concerns with the scheme above can include inaccurate and/or missing detections because bounding boxes (e.g., in updated position 116) can be inaccurate based on decoding one-dimensional codes. If decoding is not performed each frame, then detections can be missed and/or detection tracks can be mismatched. An example of a detection track is shown in updated position 116, where a dotted outline was a previous position. Also, decoding can get more challenging with faster movement and lower resolution.

One possible solution is to use more data, such as predicting location of codes 104 based on a history of images (e.g., to establish a trajectory of codes 104 in a field of view), use known arrangements of codes 104 and/or background structures (e.g. the shelf unit); and/or leverage additional sensor data (e.g., inertial measurement unit (IMU) data from gyroscopes to predict a pose change of a mobile device). However, using more data can cause lag when using a web-based application. Further, not all devices have the computing power and/or equipment (e.g., an IMU) to use more data. Accordingly, another possible solution, explained in more detail below, is to decode codes in a first frame and a third frame, and track positions of codes 104 in a second frame between the first frame and the third frame.

Figure 2:
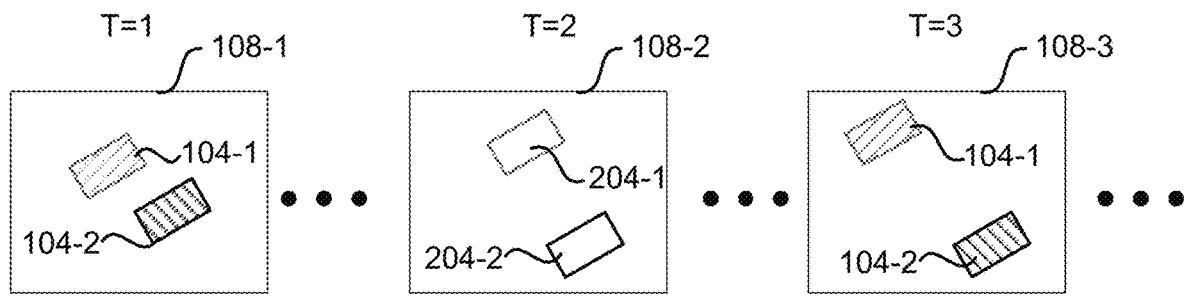
FIG. 2 depicts an embodiment of tracking codes and not decoding the codes in each frame.

FIG. 2 depicts an embodiment of tracking and not decoding codes in each frame. In a first frame 108-1, at time T=1, an algorithm is used to search for locations that look like a code 104. Locations that look like the code 104 are decoded (or an attempt is made to decode the code). Initialization of tracking the code 104 (e.g., as described in conjunction with FIG. 3 by creating a correlation filter) is also performed.

In the second frame 108-2, at T=2, codes 104 are tracked and not decoded. A tracking algorithm tries to find the new position of the tracked codes in the second frame 108-2. In the second frame 108-2, a first bounding box 204-1 is calculated in relation to the second frame 108-2 where the first code 104-1 is calculated to be (e.g., the bounding box 204 is simply calculated and/or overlaid on the second frame 108-2 in a user interface of the mobile device); and a second bounding box 204-2 is calculated in relation to the second frame 108-2 where the second code 104-2 is calculated to be. For example, a correlation filter is used create a response map, as described in conjunction with FIG. 4, to determine a position of the bounding box 204. Tracking in the second frame 108-2 does not rely on restrictions that are present when decoding codes. For example, the code 104 can be blurry in the second frame 108-2. In one embodiment, the correlation filter is learned upon initialization of tracking and is continuously updated during the tracking process to adapt, e.g. to a change in perspective. In another embodiment, the correlation filter operates on a selected subset of image features, which can be very distinct for barcodes and might get extracted using a pre-trained neural net.

In the third frame 108-3, at T=3, codes 104 are scanned and tracked. For example, an algorithm is used to search for locations that look like a code 104. Locations that look like the code 104 are decoded, and/or the tracking algorithm ascertains new positions of the codes 104 in the third frame 108-3 for codes 104 that could not, or were not, decoded.

Though only one frame, the second frame 108-2, is shown between the first frame 108-1 and the third frame 108-3, it is to be understood that the second frame 108-2 can be one of many frames between the first frame 108-1 and the third frame 108-3. It is also to be understood that actions in the third frame 108-3 can be repeated (e.g., periodically or according to an event such, as the position of a bounding box not moving more than a set distance that can indicate there might be less motion blur in an image) with actions of the second frame 108-2 occurring in between in one or more frames. Thus the tracking algorithm can determine the position of code between scanning for codes and/or decoding codes. For example, a camera in a smartphone acquires images at 30 frames per second. Actions of the third frame 108-3 in FIG. 2 are set to occur at an interval (sometimes referred to as scan rate) of 2 Hz, and actions of the second frame 108-2 in FIG. 2 are set to occur on frames acquired by the camera between the interval. In some embodiments, the interval is equal to or more frequent than 0.3, 0.5, 1, 2, or 5 Hz and equal to or less frequent than 5, 10, or 20 Hz. In some configurations, the camera has a frame rate equal to or greater than 1, 5, 10, or 20 Hz and equal to or less than 10, 30, 60, or 120 Hz. There is a tradeoff in a frame rate used between wanting a high frame rate so an object does not move too much between frames and wanting to discover new barcodes appearing as soon as possible. Applicant has found that 60 to 100 ms, such as 80 ms, between consecutive scans is a good tradeoff, because it conveys an experience of "snappiness" to the user.

In some embodiments, only new codes detected are decoded in subsequent frames. Thus in some embodiments, scanning for barcodes and/or decoding barcodes is performed in only the first frame 108-1. For example, a store employee is scanning several barcodes with her smartphone. In a first frame, scanning identifies two barcodes, and the two barcodes are decoded. The two barcodes are then tracked, and a green dot is overlaid on images displayed to the user of the smartphone using the screen of the smartphone providing an augmented-reality indication to the user of which barcodes have been decoded. The user can see a third barcode on the screen that is not covered by a green dot, so the user continues to move the smartphone to scan the third barcode. In a frame where an image is searched for locations that look like barcodes, three locations are identified: two locations corresponding to the two barcodes previously identified and a new location. The two locations corresponding to the two barcodes previously identified are not decoded, but the new location is revealing the third barcode. The third barcode is then tracked and a green dot overlaid on the screen where the third barcode is tracked to be. Thus the user can see which codes have been decoded without the application decoding each barcode each frame. Since decoding a code can take more computation resources than tracking, tracking can improve the function of the mobile device, especially when the application is a web-based application and not running as a native application.

In some embodiments, scanning for codes, which can include both searching for locations that look like codes and decoding codes, can split to occur in different frames. For example, searching for locations that look like codes occurs in a first frame, and five locations are identified. In frames two through ten, the five locations are tracked. In frame 11, a code at a first location is decoded. In frames 12-20, the five locations are tracked. In frame 21, a code at the second location is decoded. In frames 22-30, the five locations are tracked. In frame 31, searching for locations that look like codes is performed, and a sixth location is identified. The process continues searching for new locations and decoding codes.

In some configurations, tracking described in conjunction with FIGS. 2-6 can allow for more stable tracking, because tracking is not dependent on a barcode being visually decodable (e.g., as described in FIG. 1). Tracking can provide smoother visualization to a user due to increased frame rate, and/or reduces energy consumption when doing "regular" barcode scanning (e.g., because codes that have already been scanned are not rescanned). No decoding codes each frame can be helpful in various situations. In one example where the user is scanning multiple codes for inventory management, barcodes can be at a far distance. As the user moves the mobile phone quickly to scan a barcode, the barcodes can be blurry from motion blur. Thus tracking that relies on decoding codes can lose track of the barcode.

In some embodiments, a method comprises extracting a code visually, establishing correspondence between frames of decoding, predicting a location of the code, scanning again, wherein predicting is performed by predicting locations of multiple codes independently, and/or using only image data (e.g., not IMU data).

In some embodiments, the tracking algorithm described in FIGS. 2-6 can be implemented with other algorithms, such as prediction algorithms. For example, the tracking algorithm can be used in combination with a homographic prediction algorithm or when the homographic prediction algorithm fails. In some embodiments, the barcodes can be tracked as a single rigid structure. Leveraging the fact that barcodes don't move relative to each other can help to reduce computational complexity and improve fault tolerance/failure detection.

Figure 3:
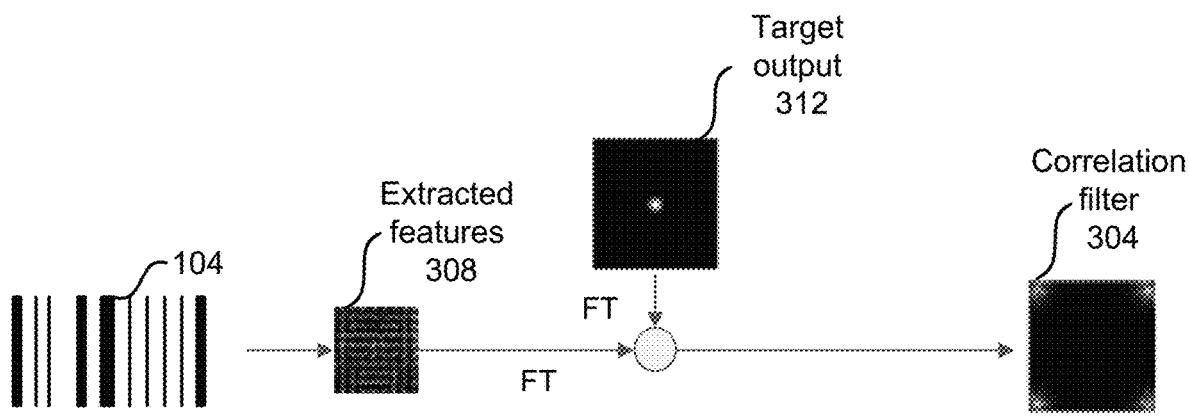
FIG. 3 depicts a diagram of an embodiment for creating a correlation filter.

FIG. 3 depicts a diagram of an embodiment for creating a correlation filter 304. FIG. 3 is an example of initialization. Extracted features 308 are obtained from the code 104. The extracted features can be areas of high contrast (e.g., image gradients), lines, corners, etc. Since in many scenarios barcodes are placed on a rigid object or surface, extracted features 308 can include geometric cues in addition to the code 100 itself (e.g., an edge of a shelf or a dollar sign can be part of the extracted features 308). In some embodiments, the extracted features 308 are converted from a visual domain into a frequency domain using a Fourier transform (FT) and combined with a target output 312 to form the correlation filter 304. The Fourier transform is efficient and reduces computation time. In another embodiment, the operation is performed in the spatial domain. In some embodiments, to "train" the correlation filter, the features are transformed in the frequency domain and then a mask/filter is computed. When convolved with the features, this will result in a target output. The target output is a desired response map in the spatial domain (e.g., a probability map of the object position; basically a matrix the size of the analyzed patch with a single peak in the center of the patch, indicating the object center position) is transformed into the frequency domain.

Figure 4:
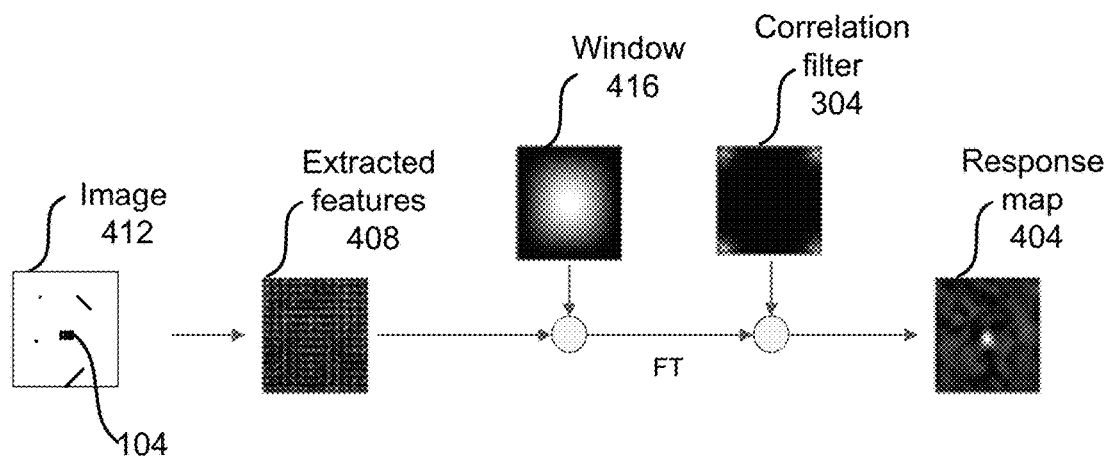
FIG. 4 depicts a diagram of an embodiment for using the correlation filter for generating a response map for tracking a code.

FIG. 4 depicts a diagram of an embodiment for using the correlation filter 304 for generating a response map 404 for tracking the code 104. In FIG. 4, extracted features 408 are obtained from an image 412. The image 412 is part of a plurality of image frames acquired by a camera. The image 412 comprises the code 104. The extracted features 408 are converted into frequency space using a Fourier transform and combined with the correlation filter 304 (e.g., a convolution) to generate the response map 404. The extracted features 408 can be combined with a window 416 before being combined with the correlation filter 304. The window 416 can be used to restrict searching for the code 104 to an area that is smaller than an area of the entire image 412. The response map 404 provides a magnitude of correlation. Thus the whiter an area of the response map 404, the more likely the code 104 will be at that area.

A frame rate for tracking can be adjusted (e.g., dynamically) based on several criteria including one or more of motion speed, size of window 416, and how far away the code 104 is from the camera (e.g., if father away, a larger window 416 is chosen and/or frame rate of images is increased for tracking).

Figure 5:
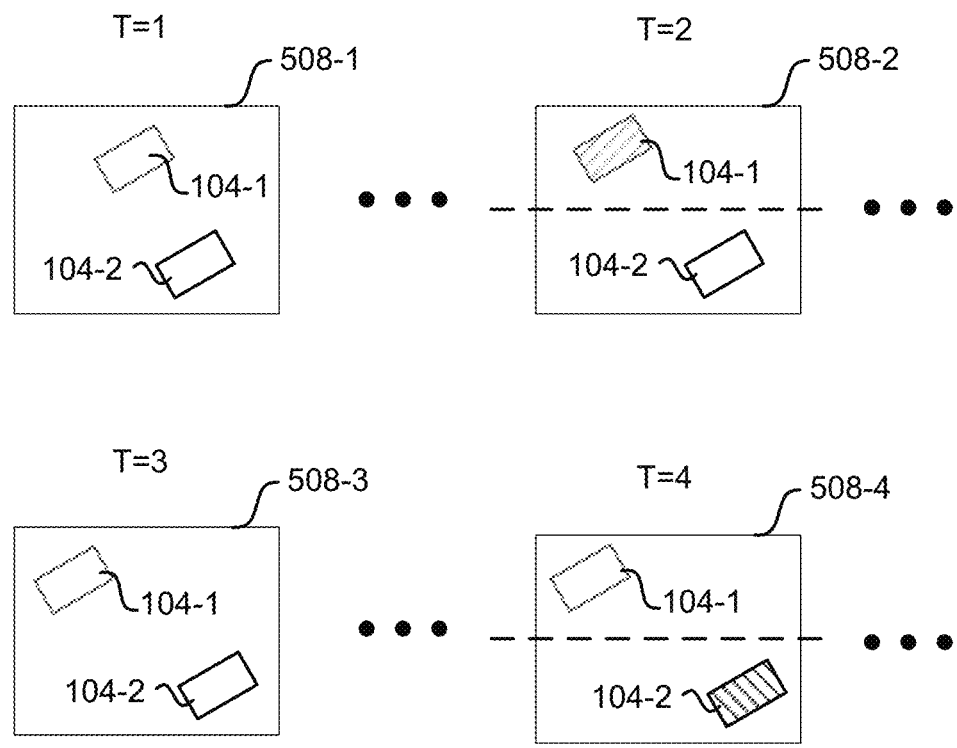
FIG. 5 depicts an embodiment of decoding codes over multiple frames.

FIG. 5 depicts an embodiment of scanning for codes 104 over multiple frames 508. In some configurations, scanning for codes (e.g., identifying and/or decoding codes) can be computationally intense. Identifying a code comprises ascertaining that a code is present in the image and/or a position of the code in the image. Decoding a code comprises ascertaining what the code represents. For example, identifying a barcode includes ascertaining that a barcode is present in a frame, and decoding the barcode comprises interpreting a series of white and black lines of the barcode to represent a numerical string. By distributing scanning across multiple frames, computation can be distributed in time. FIG. 5 depicts a first frame 508-1, a second frame 508-2, a third frame 508-3, and a fourth frame 508-4. In FIG. 5, scanning is performed over multiple frames. In the first frame 508-1, a first code 104-1 and a second code 104-2 are tracked. In the second frame 508-2, a scan for codes is performed in just the top half of the second frame 508-2. Accordingly, the first code 104-1 is identified and decoded, while the second code 104-2 is tracked without being decoded. In the third frame 508-3, codes 104 are tracked. In the fourth frame 508-4, a scan for codes is performed in just the bottom half of the fourth frame 508-4. Accordingly, the second code 104-2 is identified and decoded while the first code 104-1 is tracked without being decoded. In some embodiments, a frame 508 is divided into quadrants and discovery of new codes (e.g., a scan) is performed on each quadrant every fourth frame. In some embodiments, "attention" or "scene semantic" based decoding are used. In some configurations, this can mean that decoding can be limited to frames or parts of the observed scene that undergo a drastic visual change, and/or decoding can be limited to regions that are of special interest for a specific task (e.g., barcode labels, parts of a shelf unit, etc.).

Figure 6:
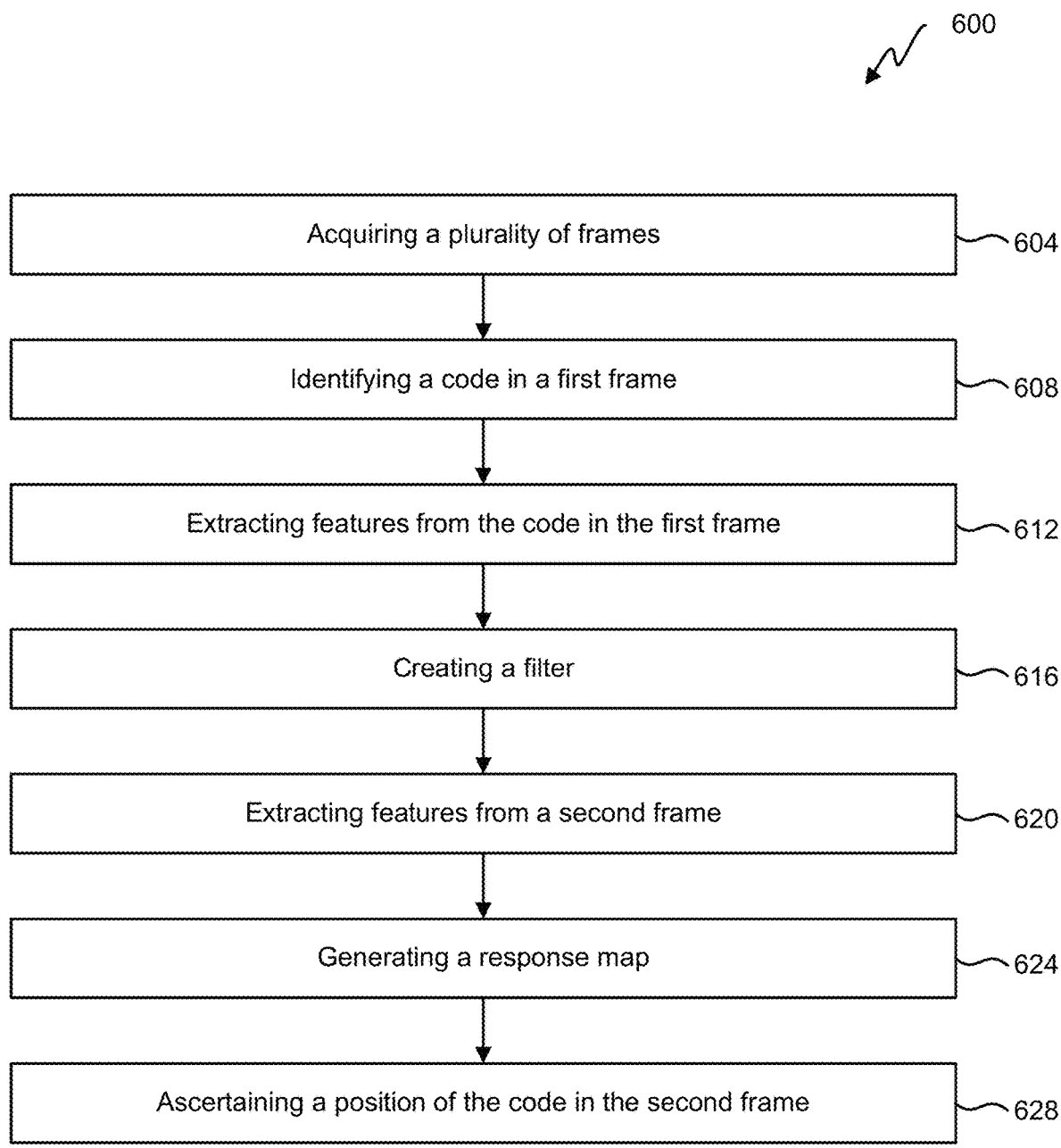
FIG. 6 illustrates a flowchart of an embodiment of a process for tracking a code.

In FIG. 6, a flowchart of an embodiment of a process 600 for tracking a code is shown. Process 600 begins in step 604 with acquiring a plurality of frames from an image sensor, wherein the plurality of frames each comprise an image of a code; the plurality of frames includes a first frame and a second frame; and the second frame is acquired after the first frame. In step 608, the code is identified in the first frame. Features from the code are extracted, step 612. For example, extracted features 308 are identified from code 104 in FIG. 3. In step 616, a filter is created. For example, the correlation filter 304 is created based on extracted features 308 of FIG. 3.

In some embodiments, detecting and tracking a code can mean tracking a plurality of codes, such as barcodes and lines of text. For example, in a retail store a price label may be tracked and in a second step one or more codes on that price label could be decoded, including on or more barcodes identifying the product; a sequence of numbers indicating the price, and/or a sequence of characters describing the product name.

In step 620, features are extracted from a second frame. For example, extracted features 408 are generated from image 412 in FIG. 4. A response map is generated based on the extracted features from the second frame, step 624. For example, the response map 404 is generated based on convolving the extracted features 408 with the correlation filter 304 in FIG. 4. In step 628 a position of the code is ascertained based on the response map. For example, areas of higher magnitude of the response map indicate a likely position in the response map of the code. Tracking the code as described in process 600 does not decode the code (e.g., to save computational resources).

A graphic indicating the position of the code, such as a box or an outline of a box, can be overlaid on images comprising the code to provide an augmented-reality output to a user showing a location of the code. The graphic can change, such as changing colors to indicate if a code has been decoded. For example, if a code was identified as being present, but the camera was too far away from the code to decode the code, a red outline around the code could be displayed to the user. The user could then move the camera closer to the code. As the code is decoded by an application (e.g., running on the device or web-based), the graphic changes to a green box, to indicate to the user that the code has been successfully decoded.

By tracking the code, a subarea of a subsequent frame can be predicted based on the position of the code in the second frame. Thus if scanning is performed in the subsequent frame, scanning of the code can be matched with the position of the code.

In some embodiments, a system to decode multiple optical codes comprises: a mobile data collector enabled with a web browser software and a display; a camera module; more than one optical codes collocated with at least one object; and/or one or more processors that receive the identity of more than one optical codes in one or more images captured by the camera module, decode the one or more optical codes, and/or visualize the decoded codes on the display of the mobile data collector. A system can comprise: a mobile data collector enabled with a web browser software and a display; a camera module; more than one optical codes collocated with at least one object; and/or one or more processors that detect the presence of more than one optical code in an image captured by the camera module, decode the more than one detected optical codes in the image, visualize the location of the detected codes on the display of the mobile data collector, and/or visualize the decoded codes on the display of the mobile data collector. A system can comprise: a mobile data collector enabled with a display and a camera module; a plurality optical codes collocated with at least one object; and/or one or more processors that detect the presence and locations of the plurality of optical code in a first image captured by the camera module, decode a subset of the detected optical codes from the first image, detect the presence of the plurality of optical code in a second image captured by the camera module, tracking the position of the plurality of optical codes from the first image to the second image; and/or decode a subset of the detected optical codes from the second image, the subset comprising of codes that have not been decoded from the first image.

Code Mapping

Code mapping can be used to enable a user (e.g., a store employee) to capture locations of codes (e.g., SKUs/products) in an environment (e.g., on shelves in a store). Identifying and tracking codes can help enable creating a virtual diagram of a physical structure. For example, a virtual diagram of a shelving unit could be used to help answer one of more of the following questions: Where is a product located on a shelf, on which shelf, and/or at what height? Is a product at a correct location (e.g., does product placement comply with a planogram)? What does a particular shelf visually look like? What was the state of the shelf two weeks ago? Is the price of the product correct? Does the product correspond with the label? Is the number of products on a shelf low (e.g., should the shelf be restocked)?

In some embodiments, a cloud service, such as for storage, APIs, dashboard, etc., is used to allow multiple users to provide and/or retrieve data. For example, in a retail setting multiple employees with multiple mobile devices can contribute to data capturing; and/or different stakeholders can view data for parts of data in raw and/or aggregated versions. A cloud-based application can also allow for faster software development cycles.

In some situations, mapping is restricted to certain structures. For example, in a retail environment, shelves are imaged as two-dimensional structures, wherein a plurality of barcodes are mapped to be on one plane oriented vertically (a normal of a vertical plane points horizontally). Products on a shelving unit can be identified by barcodes on the shelving unit. In some embodiments, products on the shelving unit are identified by visual product recognition.

Data can be stored in a remote location (e.g., the Cloud). Data can be agnostic from a capture and/or display device. For instance, different mobile capture devices (e.g., different tablets and/or smartphones can be used) and captured data display can be in a mobile app or a web-based dashboard. Capture runs can be per SKU, per shelving unit, and/or per store, and can be flexibly combined from different capture devices.

In some configurations, code mapping can be used for planogram compliance (e.g., comparing SKU location with a planned location); planogram analytics (e.g., for sales numbers); in-store navigation to a product; and/or AR marketing (e.g., instant promotion when a customer is within a predefined distance of a product).

In certain embodiments, creating a code map includes: identifying a plurality of SKUs SKU (e.g., by reading a barcode on a shelf and/or by product recognition); segmenting a SKU area (e.g., an area of one type of product; done through image segmentation); ascertaining a two-dimensional layout (e.g., which SKU is next to another SKU on a shelving unit and/or aisle); calculating distances between barcodes (e.g., absolute distance in centimeters or relative distance); capturing a three-dimensional layout of barcodes (e.g., relation of multiple aisles); and/or understanding the concept of shelves (e.g., vertically divided units).

A SKU can be identified by scanning a barcode on a shelf. For identifying a SKU by product recognition, a classifier is run on an image that can label the product and/or segment an outline concurrently. The outline can be a rectangle or a pixel-wise image segmentation (e.g., using a convolutional neural network (CNN)-based classifier). The classifier can be pre-trained with a generic data corpus (e.g., ImageNet), and fine-tuned/adapted to the product recognition use-case. Preferably, new products can be added with few examples (e.g., one-shot-learning). Examples of CNN-based object detection frameworks are YOLO, R-CNN, SSD, etc., but some can also be custom-built.

Figure 7:
FIG. 7 is an example of segmenting products on a shelf from an image.

FIG. 7 is an example of segmenting products on a shelf from an image. FIG. 7 depicts a frame 704, which is an image of products 708 located on shelves 712. Segmenting a SKU area can be performed through image segmentation. If a product 708 can be recognized directly from an image, a classifier can be used to segment a SKU area. If the product 708 is recognized through a barcode 716 on the shelf 712, this could be done based on image content, given the barcode location. An example approach includes ascertaining if the product 708 corresponding to the barcode 716 is above or below the barcode 716. Determining if the barcode 716 is above or below a product 708 (or to a side), can be solved with a trained binary classifier, an ad-hoc rule, and/or a human input. Image analysis is then used to expand the region (e.g., above or below the code) to the left and right, based on similar image content. In the frame 704 in FIG. 7, the product 708 corresponding to the barcode 716 is above the barcode 716. Similar image content can be measured for example with interest point matching, (cross-)correlation, color analysis, etc. Segmenting can be based on an assumption of using an undistorted image and/or similar product is horizontally aligned with shelf rows. A segment 720 (a dashed line) of the product 708 shows the product 708 corresponding with the barcode 716.

Figure 8:
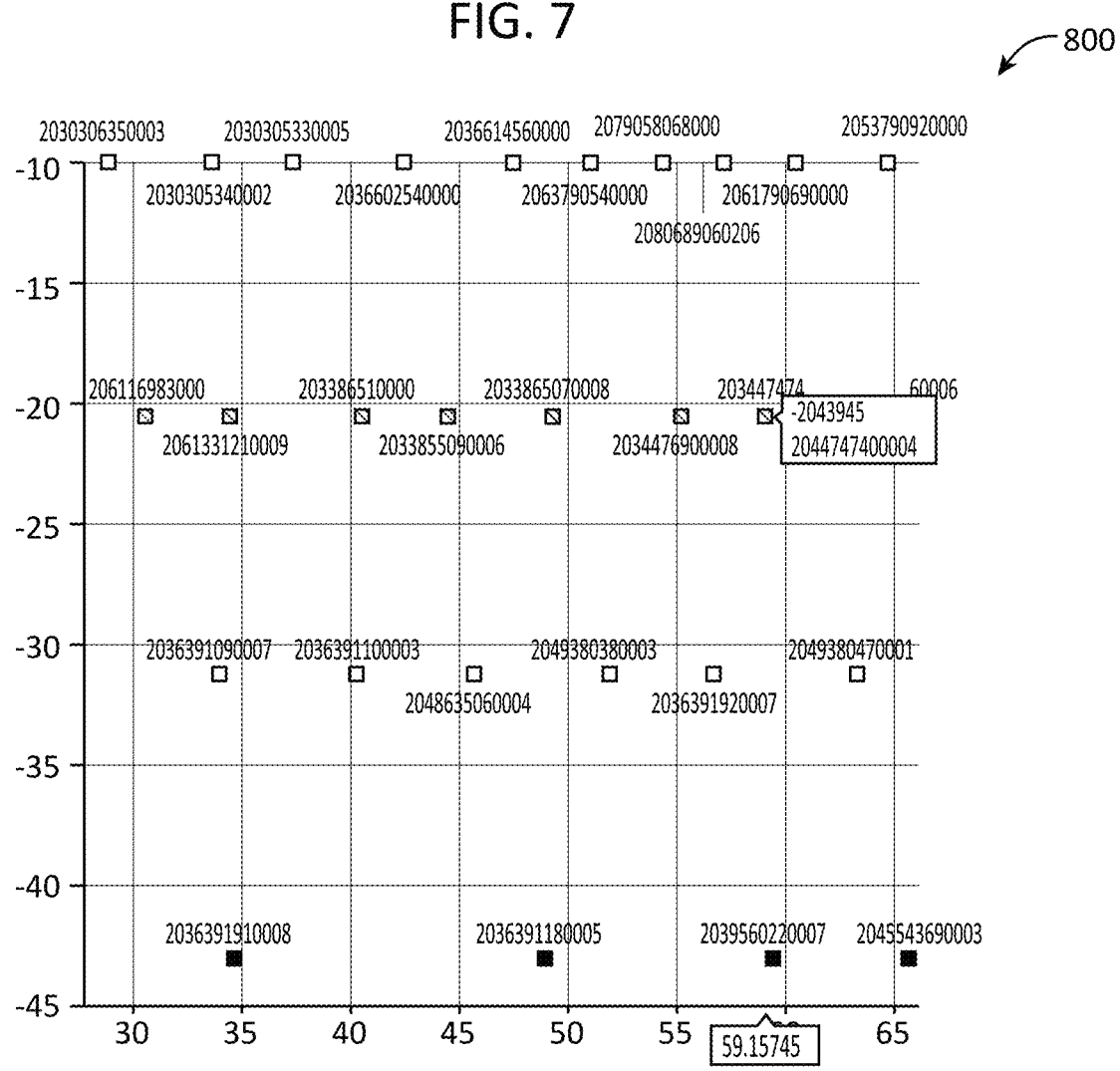
FIG. 8 is an embodiment of a shelf diagram.

FIG. 8 is an embodiment of a shelf diagram 800. The shelf diagram 800 provides information about a two-dimensional layout of SKUs (e.g., which SKU is next to another SKU). In this embodiment, SKUs are recognized by barcodes. If only one barcode is visible at a time, a user scans barcodes in a defined order (e.g., a sequence left to right for each shelf; starting on a top of the shelf, moving down row by row). However, this provides only layout and not distances (relative or actual). If more than one barcode is visible, such as discussed above with Matrix Scan, then barcodes are mapped relative to each other. For example, starting on a top left of a shelf, and maintaining inside a current field of view a barcode that was previously referenced, a newly recognized barcode can be referenced (e.g., left, right, top, bottom) with respect one or more known ones. Some assumptions can simplify mapping. For example, in some configurations, it can be assumed that the barcode capture view is aligned with shelf rows and there are no gaps. Approximate relative distances can be calculated using spacing between barcodes in images.

To provide relative distances between barcodes, when only one barcode is visible in a capture view, some embodiments can start with capturing one or more overview images of a shelving unit. In these overview image(s), barcodes are not (or cannot be) decoded (e.g., because they are too small, but barcode location regions can be identified). The overview images are rectified, distortion corrected, and aligned with shelf rows. If there are multiple fields of view with different barcodes, they are stitched together, or at least referenced with respect to each other. Individual barcodes are then captured, including the image content surrounding the individual barcodes. With help of the image content, with or without relying on identified barcode regions, individual barcode images can be registered into the overview image(s). Matching can for example be done with image interest points, using RANSAC (random sample consensus) for homography or other image analysis for estimation. In some embodiments, registering individual barcode images with the overview image(s) comprising identifying horizontal lines corresponding to shelves and using the horizontal lines for horizontal alignment of images and/or combining images. This approach has an advantage of capturing (relative) distances between barcodes with the help of the overview image(s).

In some embodiments absolute distances between barcodes is calculated (e.g., in cm). For example, Matrix scanning can be used to track two or more barcodes at the same time, either with or without decoding the barcodes. An algorithm can include the assumption that shelves are planar (i.e., a two-dimensional problem, where codes are arranged in the same plane), which can simplify some calculations. In a first option, scale can be determined by a known width of a reference in an image. For example, if a height and/or width of a barcode is known, such as 1.2 cm, then that scan can be used as a reference to transform relative measurements to absolute measurements. Barcodes of the same type can appear in multiple images providing redundancy. In a second option, a known, calibrated camera and a moving device (e.g., using SLAM (simultaneous localization and mapping)), can be used to determine scale. In a third option, a stereoscopic camera or a depth camera can be used. The three options above are not mutually exclusive.

A three-dimensional model of a store can be generated. The three-dimensional model can be made by combining a plurality of two-dimensional models (e.g., of shelving units) and/or using a single device by implementing a SLAM algorithm or SfM (structure from motion) pipeline (Apple's ARKit or Google's ARCore offer such reconstruction capabilities on their respective mobile platforms). Barcodes can be decoded in close-up scans and localized within a three-dimensional store model. Another option would be to use multiple cameras (stereo) and/or a depth camera. In a further option, two-dimensional models of shelves are created and a user identifies locations of shelves within a store (e.g., using a store layout blueprint). In another embodiment, store layout models are derived from existing CAD models, for example coming from initially planning the retail surface.

The concept of shelves (e.g., vertically divided units). From an application perspective, a shelf (or module or shelving unit) is the describing unit between store and product. A product is located on a shelf, and all shelves in the store have unique identifiers. Thus it can be helpful to record physical boundaries of the shelf in a digital representation. If shelves are mapped one after the other, in the 2D case, then capturing shelf identifiers can be done through manual entry of the identifier, or manual capture of a dedicated barcode (or different code type) located at the shelf. Though automated entry can be preferred, if shelves do not carry identifiers, manual entry can be used. In some embodiments, the identity of the shelf can be inferred from the position of the camera/device. For example, in some embodiments, the location of the phone can be determined using WiFi fingerprinting, Bluetooth beacons, GPS, SLAM (simultaneous localization and mapping), or IMU tracking. In the workflow, this is, for example, done before capturing the SKU map of that shelf. If the store is directly reconstructed in 3D, shelf segmentation (vertical division) can be automatically performed by image analysis, searching for vertical divider lines within a certain (parametrizable) distance from each other.

An application used for scanning a shelf can be structured in a certain way, e.g. the individual SKU's are scanned in order. For example, a store associate can collect the SKU data in an S-shaped pattern going (by way of example) from the upper left to the lower right, switching direction for each individual shelf so as to minimize travel time. Data (e.g., for each shelf) is collected and sent to the backend. Data for each shelf can include: Shop ID: identifier of the store; Shelf ID: identifier of the shelf; Time: timestamp of acquisition start & end; for each SKU: EAN/barcode, position (shelf row, item position), acquisition timestamp, price (read price, correct price), and/or product image; and/or smartphone identifier: to differentiate uploads from different mobile phones.

Data for a particular product is arranged in vector form (e.g., an n×1 matrix). Table I below provides a sample vector for data mapping. The vector comprises the code and a relative position of the code to a shelving diagram (e.g., the vector is the "Value" column).

TABLE I

| Sample product data | |
|---|---|
| Descriptor | Value |
| SKU ID | 2036391100003 |
| Shelf ID | 21A7 |
| Barcode location (x) | 40 |
| Barcode location (y) | −30 |
| Product class (e.g., dairy) | 005 |
| Product area (x) | 40, 45 |
| Product area (y) | −30, −40 |

Figure 9:
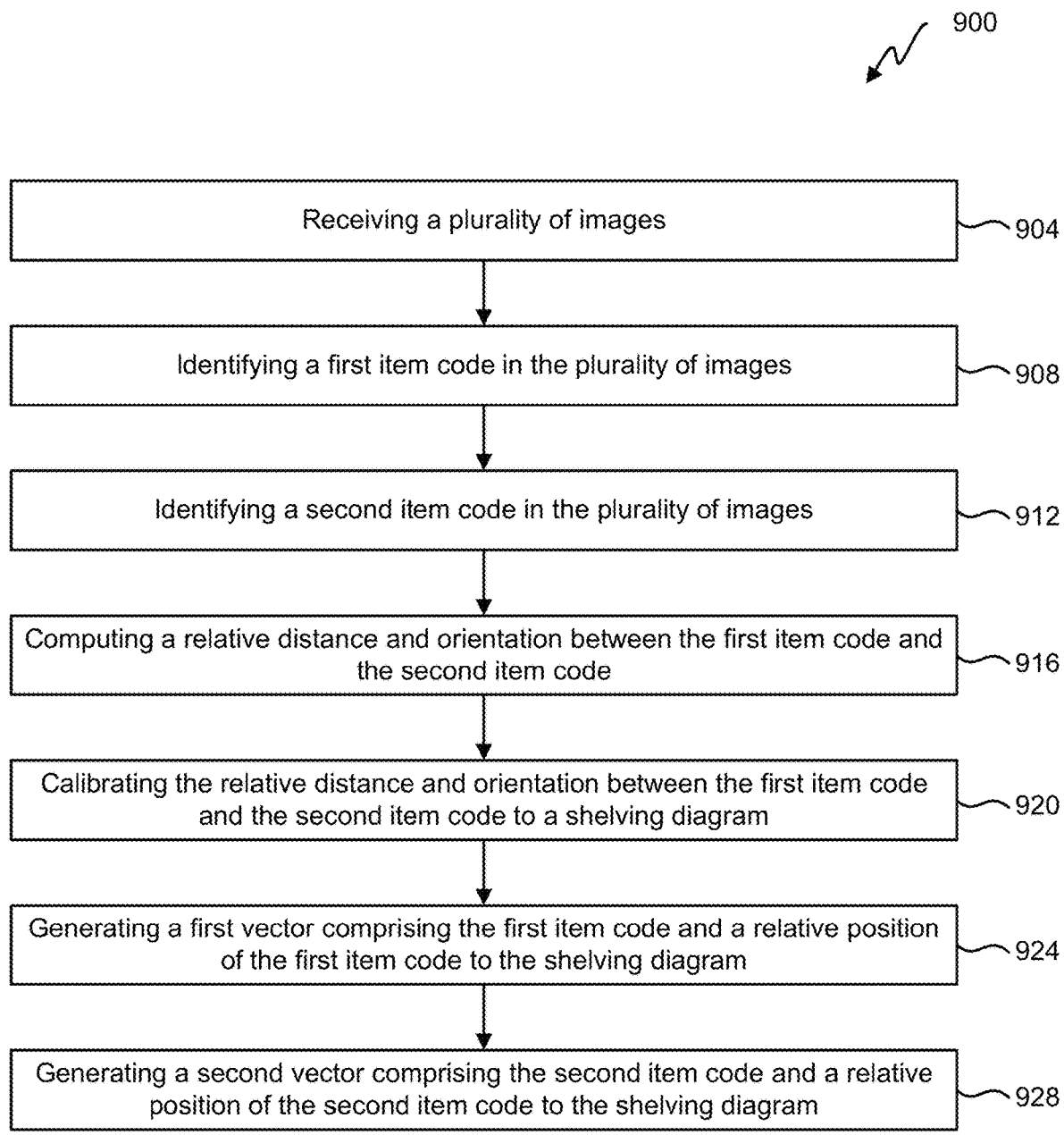
FIG. 9 illustrates a flowchart of an embodiment of a process for mapping objects on a shelving unit.

In FIG. 9, a flowchart of an embodiment of a process 900 for mapping objects on a shelving unit is shown (e.g., creating a digital map). Process 900 begins in step 904 with receiving a plurality of images. For example, images are acquired by a camera from mobile device. In step 608, a first item code is identified in the plurality of images. For example, the first item code is a barcode identifying a first SKU and identifying the first item code comprises decoding the first item code. In step 612, a second item code is identified in the plurality of images. For example, the second item code is a barcode identifying a second SKU and identifying the second item code comprises decoding the second item code.

In step 916, a relative distance and orientation between the first code and the second code is computed. The relative distance and orientation could be based on positioning the first item code and the second item code on a relative coordinate system (e.g., a coordinate system shown in FIG. 8; such as a second barcode is four units to the right and three units below a first barcode). In some embodiments, an absolute distance is measured (e.g., the second barcode x position is equal to the x position of the first barcode plus 24 centimeters and the second barcode y position is equal to the y position of the first barcode).

In step 920, relative distance and orientation between the first item code and the second item code are calibrated to a shelving diagram. For example, multiple codes are combined to the shelving diagram shown in FIG. 8. The relative distance and orientation between the first item code and the second item code are used to designate a position of the first item code and the second item code in the shelving diagram (e.g., the first item code has coordinates of 0,0 and the second item code has coordinates of 4,−3, if the first item code was chosen as an origin of the shelving unit).

In step 924 a first vector is generated comprising the first item code and a relative position of the first item code to the shelving diagram. For example, Table I provides a vector with a barcode ID and x/y coordinates of the barcode with respect to shelf 21A7. Similarly, the second vector is generated comprising the second item code and a relative position of the second item code to the shelving diagram, step 928.

In some embodiments, a system to map the location of objects on display comprise: a mobile data collector reading optical codes; labels with optical codes collocated with the objects on display; and/or one or more processors that receive the identity of more than one label, compute the relative distance and orientation between the more than one labels, and/or arrange the locations of the more than one labels on a map.

Shelf Visualization

Shelf Visualization can be used to enable users (store employees, managers, etc.) to visualize a current and/or previous state of a shelf in a retail store, and/or display (e.g., overlay or through an additional window in a graphical user interface (GUI)) additional relevant information. Some embodiments are restricted to planar shelves, but other embodiments include a product on most any type of point of sale (PoS) in a store. Shelf visualization can enable remote visual inspection of a shelf; street-view style stroll through retail store from a couch, towards shopping experience; and/or augmented or virtual reality applications.

Figure 10:
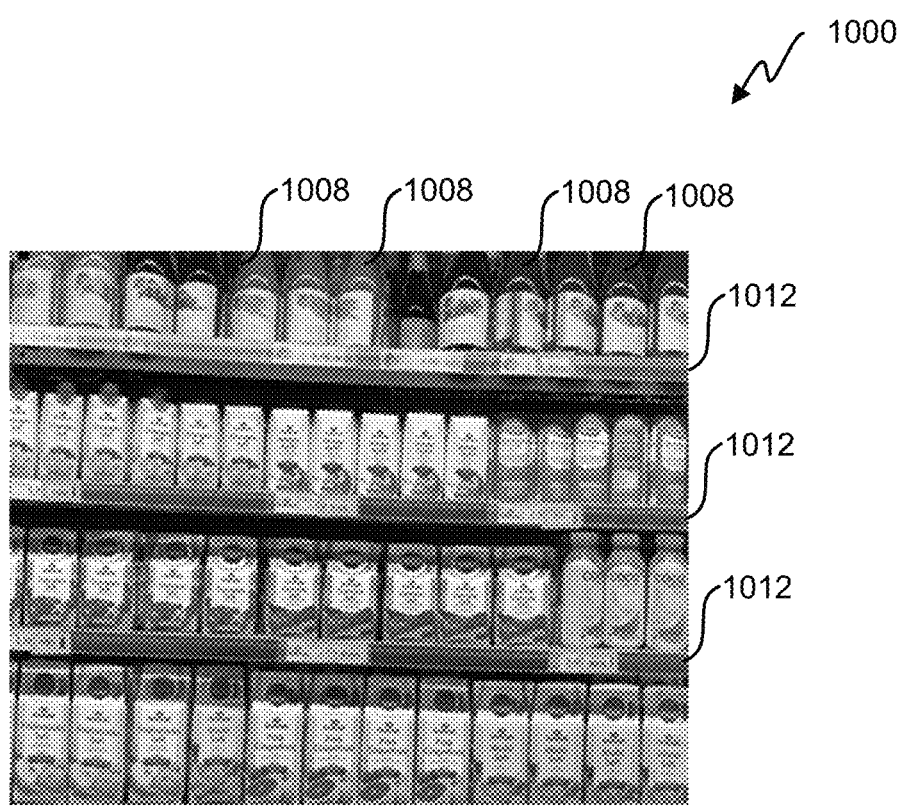
FIG. 10 is an example of blending two images of a shelf.

FIG. 10 is an example of blending two images of a shelf. FIG. 10 shows a combined image 1000 of product 1008 on shelves 1012. The combined image 1000 can appear somewhat blurry because the combined image 1000 can be formed by two or more images. Shelf visualization can be an image stitching problem. Though panoramic pictures are made using image stitching, constraints for shelf visualization are different than for traditional panoramic image stitching. For example, a shelf (e.g., a shelving unit) can be close but does not fit onto one camera view. Shelf is captured from multiple different viewpoints, and there can be significant (with respect to the object) camera shift between the captured images (e.g., parallax). However, it can be assumed that there is no motion in the scene between the captured views. Updates of the visualization can come from multiple capture devices, and from multiple instants in time, even from single SKU capture instances. Image blending often includes exposure compensation to make the visualization look appealing. As the visualization is updated, sifting through images of a shelf in time is possible.

In some configurations, analog to image stitching includes the following: detecting key points and extracting invariant descriptors in images; matching the descriptors between two images; using RANSAC (as an example for a number of similar techniques) to estimate a homography matrix using the matched image feature locations in both images, wherein combine the two images only if there are many matched features (e.g., using a threshold); applying a warping transformation using the homography matrix obtained; and blending images (e.g., resize, compensate exposure, find seam).

In some configurations, the problem is formulated as a joint-optimization problem (e.g., rather than a pair-wise image matching problem). This can be a SfM problem. This can also be done based on other feature types, such as lines (e.g. part of the shelf unit), not only points. In some embodiments, homography can be constrained to improve fault tolerance, e.g., by assuming a near front-to-parallel view. In some embodiments, this problem can is addressed by formulating a global optimization problem. Considering the relationship between multiple images while jointly trying to optimize/derive rough estimates for the positions from which the images were taken (derived visually and by correlating time stamps) could reduce errors. In some embodiments, high-quality image recordings can be supported by low-level image descriptors or even a planar estimate of the performed motion taken at a much higher frequency (e.g. estimated from the gyro or through the image; related to tracking), allowing it to correlate images better and optimize the "stitched" panorama image. In some embodiments, sequences of images (or a video) are recorded in order to reduce parallax between captured frames, and be able to render with minimal visual artifacts. Sensors of the capturing mobile device (IMU/acceleration sensors) can be used (and/or sensor fusion with images based on cues) to improve the stability.

While capturing SKUs, the user can also capture close-up images of SKUs, where the barcode is recognizable. These close-up images can be integrated into the overview images, in order to be able to provide a zoom in and/or show high-resolution images of the product and/or barcode. The stitching algorithm takes into account large parallax and scale change. Image bending is done carefully, in order to minimize visual artifacts. In some embodiments, close-up images are available for all SKUs, and the overview image (s) are used to reference the close-ups with respect to each other, and if needed, fill in content in between the close-ups. In some embodiments, for minimal visual artifacts, the style of the close-up images is matched to the overview image. This may include adaptations of contrast, brightness, color saturation values, or synthetic exposure correction (or similar techniques). In some embodiments, blending is applied for a smooth transition between the overview and the new close-up image, where content from both images are superposed. In some embodiments, "seam carving" algorithms are used for optimal seam location detection.

Figure 11:
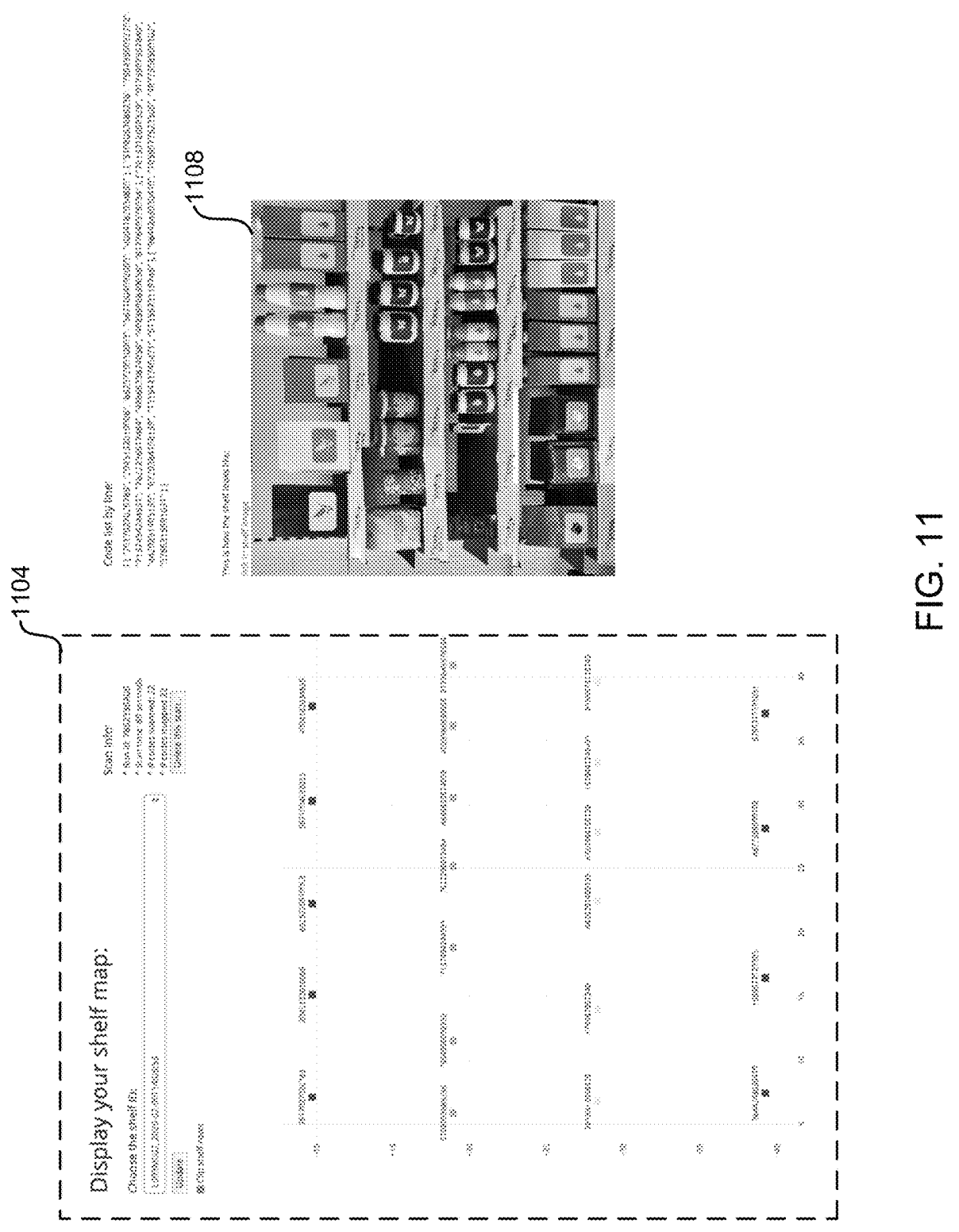

FIG. 11 is an embodiment of a shelf diagram 1104 with a visual image 1108 of the shelf. Product information can be integrated in the visualization. For example, visualization can be searchable by product, and the searched product can be highlighted within the image visualization; the visualization can include an overlay with product information, such as price, stock level, allergens, etc.; specific products can be highlighted in the images (e.g., products that are on promotion, or should be changed to promotion soon; or products that have the wrong price or the wrong location in the planogram).

Figure 12:
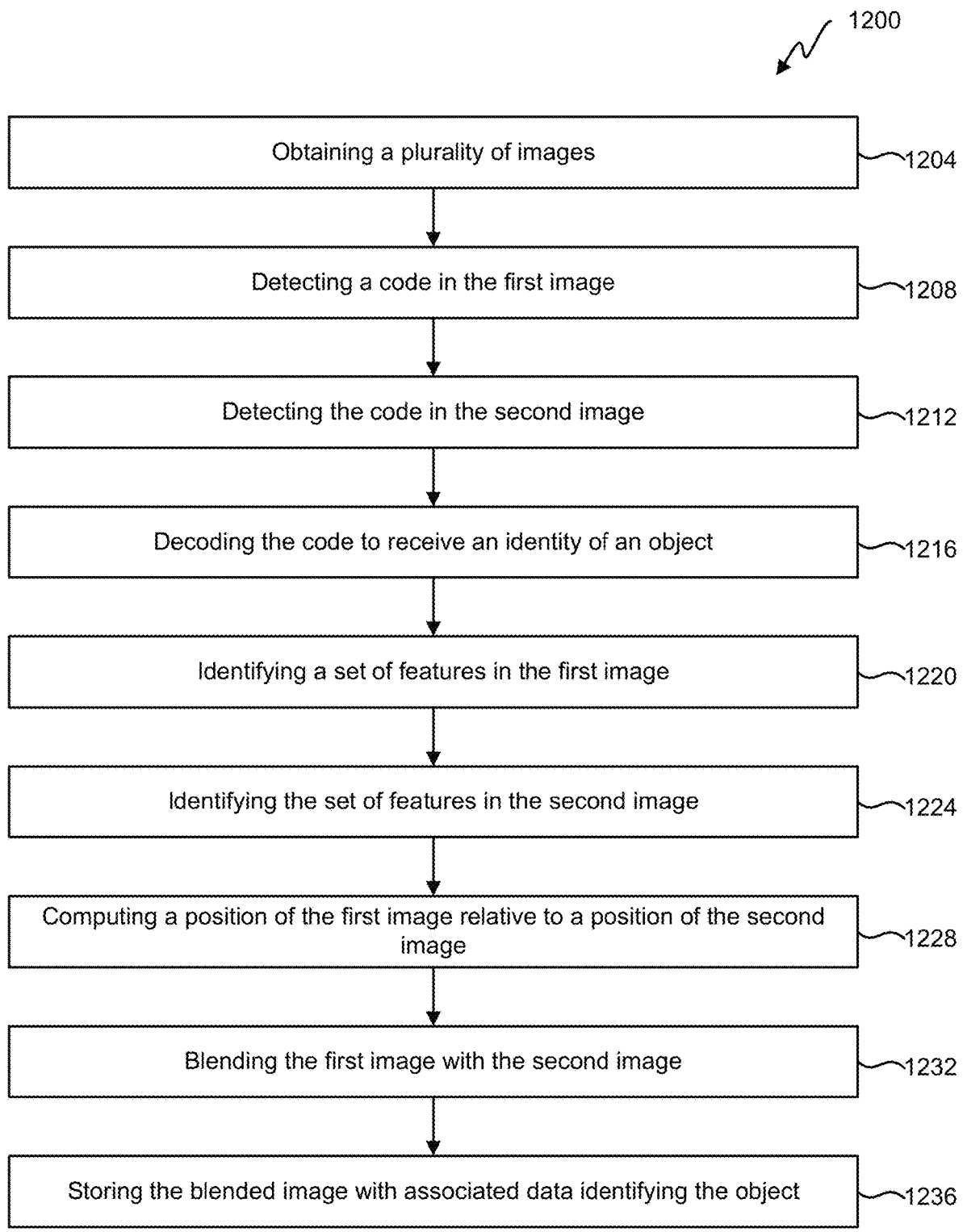
FIG. 12 illustrates a flowchart of an embodiment of a process for creating a visual image of a shelf.

In FIG. 12, a flowchart of an embodiment of a process 1200 for creating a visual representation of objects on a display from multiple images is shown. Process 1200 begins in step 1204 with obtaining a plurality of images, wherein the plurality of images comprise a first image and a second image. A code in the first image is detected, step 1208. The code in the second image is detected, step 1212. The code is decoded to receive an identity of an object in the first image, step 1216. A set of features are identified in the first image, step 1220. The set of features are identified in the second image, step 1224. A position of the first image is computed relative to a position of the second image, based on comparing locations of the set of features in the first image to locations of the set of features in the second image, step 1228. The first image is blended with the second image based on computing the first image relative to the second image to create a blended image, step 1232. The blended image is stored with associated data identifying the object, step 1236. In some embodiments, metadata of the combined image comprises a link or a reference to a database linking the combined image and the information identifying the object.

In some embodiments a system comprises: a mobile data collector reading optical codes and taking images of the objects on display, labels with optical codes collocated with the objects on display, and/or one or more processors that receive the identity of at least one object in one or more image, compute the position of the more than one images relative to each other, and/or compute a panoramic image representation from the one or more images.

Simultaneous Use of Barcode Decoding, OCR, and/or Visual Shelf

In some embodiments, a combined tool can allow a store associate to do several tasks concurrently. For example, a barcode can be scanned and a price label decoded using optical character recognition (OCR); a price associated with the product ascertained from scanning the barcode (e.g., by referencing a data base), and the price associated with the product compared to the price label to verify a match. While price verification is being performed, images can be used to look for an out-of-stock situation. Thus operational tasks can be done in one walkthrough by an associate or robot.

Some decoding tasks can be computationally intense, such as using OCR. By decoding a code once, and then tracking the code, without decoding the code, can save computational resources.

A. Example Users in a Retail Environment i. Susan—Retail Associate

Susan is a store associate about 30 years old. The store is a mid-sized grocery chain. Susan has no college degree. Although Susan knows her way around mobile devices, she is not considered tech-savvy. Susan has been changing her retail employer three times in the last two years. She works different shifts depending on the week. As part of her job, her boss asks her regularly to walk through the store and perform certain data collection tasks, such as verifying price labels, recording shelf gaps, or verifying planogram compliance. Susan has access to a Zebra TC52 device. Susan's biggest concern is that she perform the store walk throughs as quickly as possible with as much accuracy as possible.

Susan desires to run a session on her phone to quickly scan 1000s of SKUs to collect and/or verify price label information (PLI). This is a daily task for her, and speed and accuracy are important. As she scans SKUs for price label verification, she would like to also be creating a digital map of the SKUs on the shelf. It is preferable for Susan to run a session on her phone to collect data and have the data uploaded to a server in the Cloud.

In this example, Susan can scan a SKU, look at an individual date code, and enter the code that is to expire the soonest into the app. In other configurations, the individual date code is decoded using an image of the individual date code. In another variation, Susan enters every date code found into the app and also specifies a quantity of product associated with each date code. Susan can also identify a gap on a shelf while working on a different task. She can walk up to the gap and scan the SKU associated with the gap. In a user interface, she can optionally specify how many products are left on the shelf.

ii. Paul—Store Manager

Paul is about 45 years old, married, and has a couple kids. He typically works from 8 am to 6 pm as a store manager in a large grocery chain. Paul has some college and is more of a desktop user than a mobile-device user. He spends most of his time at his desk in the management office behind his large computer screen. Paul has been working for the chain for almost two decades. He likes to do things in the way they have always been done. Paul maintains the schedules for routine store walk throughs and directly supervises store associates. Paul uses his iPhone 8 at work.

With a web-based application, Paul can: create a task list listing compliance and operational issues, e.g., labels to be reprinted and replaced; gaps to be filled, etc.; confirm on the portal that an issue has been resolved; review reports relative to operational tasks/data in the store, time frame, store associate performing a task, type of event (PL non-compliance, gap scan, etc.); check out summary statistics regarding the above and show company trends over specified time frames/timeline; and/or zoom into ShelfView and review most recent visual data of the shelf.

iii. Camilla—Nationwide Store Operations

Camilla is about 50 years old, married, and has 2 grown kids. She typically works from 9 am to 7 pm and is responsible for Store operations for 200 stores. She has an MBA degree. Camilla fluently moves between her mobile, iPad, and Windows laptop. She is used to monitoring operations from anywhere and at any time of day. Camilla has been in her current role for only two months, but has already run into resistance from the IT department when she tried to push new software tools. Her biggest problem is that she has no real-time visibility into the tasks being performed in stores. Therefore, she does not know if the company is compliant with relevant regulations.

With a web-based application, Camilla can review reports relative to operational tasks/data in the store; filter reports to subset of stores, time frame, store associate performing a task, type of event (PL non-compliance, gab scan, etc.); check out summary statistics regarding the above and show company trends over specified time frames/timeline; and/or zoom into ShelfView and review recent visual data of a shelf.

B. Example System Components

The web-based application can be configured for Multi-tenants, where multiple retailers are hosted on the same system; multiple user roles with different levels of access, such as store associate, store management, corporate management, etc.; multiple data elements that can include one or more of the following fields: time and date, session identifier (user, date, store), a decoded optical code (Universal Product Code (UPC), International Article Number (EAN)), shelf/location identifier placeholder, high-resolution, raw image of detected barcodes, or other areas to be decoded (OCR), low-resolution image of full field of view, and/or other fields (e.g., as described by the applications below); individual data fields can be eligible for individual deletion schedules (storage needs and privacy concerns); customer can have the ability to schedule data deletions on a multitude of schedules: a) daily, b) after 48 hours, c) weekly, etc.; and/or deletion can be scheduled for dates and for specified time periods after data collection.

The web-based application can be configured to provide data reports, including data downloads filtered in certain formats such as CSV, XLS, or PDF; filtered data reports can be available via a web API.

C. Example Applications and Workflows

An application can have a single SKU mode. The single SKU mode can be configured for walk-up gap scan/PLV SKU Scan. In this mode, the store associate walks up to a gap on the shelf and scans the SKU code. The user interface guides the operator in such a way that the display location of the product is within a field of view of the camera. The system uploads a high-resolution image of the label and the JPG images of the surrounding area. The user has an option to enter the following data in a manual interface: number of inventory left, earliest date code, and/or general text entry (free comment). On a back end, data is processed as follows: PLV performed and added to PL event list if incorrect; added to gap event list; log other information (inventory level, date code) if available; and/or visual information of the shelf location is included in a shelf panorama image.

The single SKU mode can be configured for "Walk-up data entry" SKU Scan. In this mode, the store associate can walk up to a price label or SKU and scan the code. The user interface can guide the store associate in such a way that the display location of the product is within a field of view of the camera. The system uploads a high res image of the label and JPG images of the surrounding area. The user has an option to enter the following data in a manual interface: out-of-stock, number of inventory-left (including out-of-stock and "low inventory"), earliest date code, and/or general text entry (free comment). On a back end, the data is processed as follows: PLV performed and added to PL event list if incorrect; added to gap event list, if inventory is low/zero; and/or log other information (inventory level, date code) if available The single SKU mode can be configured for a batch mode, such as a systematic shelf scan. In this mode, a store associate systematically scans all the products on a designated shelf, moving from left to right, top to bottom. The user interface can be configured to guide the store associate in such a way that the display location of the product is within the field of view of the camera. The system uploads a high-resolution image of the label and JPG images of the surrounding area for each scan. The user (e.g., the store associate) has the option to enter the following data in a manual interface: number of inventory-left including "out-of-stock", earliest date code, and/or general text entry (free comment). Furthermore, the user has the option to do the following: scan or enter the shelf/module identifier (upper left corner); erase scans to correct for mistakes; and/or restart data collection for the same shelf/module by starting a scan from an arbitrary SKU (data following that SKU will be overwritten). Although left-to-right scanning is given as an example, other scan patterns (e.g., right to left, down up then right, etc.) can be used. In some embodiments, a scanning pattern is determined by orientation of a device. For example, a phone held in portrait orientation could be used to scan down so that there are like more SKUs in a field of view of the camera, whereas a phone held in landscape orientation could scan right to left so that more than one SKU is likely in the field of view. On a back end, data is processed as follows: PLV performed and added to PL event list if incorrect; added to gap event list if inventory is low or out-of-stock; or other information (inventory level, date code) if available; and/or visual information of the shelf location is used to rebuild the visual state/shelf panorama image.

D. Example Performance Metrics

In some configurations, an application has the following performance metrics and/or tolerances. Speed: a reasonably skilled operator spends no more than 500 ms per time to complete scanning a single code. SKU mapping: distances between SKUs are within +/−10% of the true distance for 99% of measured SKUs. SKU mapping and visualization: There are not obvious visual artifacts from the stitching process.

E. Example Image Upload and Processing

In some configurations, high-resolution raw images are uploaded of detected codes (e.g., barcodes, price labels, etc.) and/or JPEG quality images are uploaded of the entire image frame showing the label, display area with inventory, and/or adjacent labels. A barcode view finder is placed in such a way as to reasonably assure that the inventory location is in a field of view of the camera.

For on-device PLV, a single SKU Data Capture PLV can be performed directly on the device and the result shown to the user in an augmented-reality (AR) overlay. In some embodiments, it does not take more than 500 ms for the result to be presented to the user.

For some configurations of backend-PLV processing, there is no more than 10% of false positives (10% of detected mistakes). Incorrect price labels from a session/day can be accessible along with the image data for quality review by a human operator. The data can be presented to an online operator in such a way that the operator can check from image to image quickly and flag/correct labels that have been miss-decoded. After quality control, data can be added to a PLV task list.

For some configurations of SKU mapping and visualization, as the user is scanning one SKU after the other, a map is being built by preserving an order of SKUs. Data collection can include distances between SKUs while building the map. The map can include vertical distances between shelves.

In some configurations of using manual status entry, a user is able to count the inventory level and enter the information through the user interface (e.g., during batch scan or individual SKU scan). An interface on a mobile device can be configurable by an enterprise user (e.g., to show only data entry options to be performed by the store associate). For example, an inventory interface can have a number entry field for the store associate it to enter a number of items. An out-of-stock interface can include an out-of-stock button, a low stock button, a replenish button, and/or a specific replenish/reorder (number entry field). A date-codes interface can include oldest date code (date entry field), multiple date codes, and/or inventory number (e.g., list of numbers and/or dates).

F. Example Portal Application(s)

In some configurations of SKU, Task, Event, and/or date code reports, a user can request a report on a specific SKU showing the following: all scan events within a specific time range, including scans that did not result in a violation; shelf images within a specific time range; and/or violations within a specific time range. The user can request a report on a SKU(s) and/or an event(s) filtered by one or more of the following criteria: tasks collected in a certain calendar range; tasks collected in a specific data collection session; tasks collected by a specific user; tasks within a certain product category; tasks of a specific kind (e.g., date codes, out-of-stock, price label correction); resolved violations confirmed by user input (e.g., date-code violation, out of stock, price label correction); and/or resolved violations confirmed by shelf scan (e.g., date-code violation, out of stock, price label correction). A user can request a report on SKUs with date codes (e.g., a date code report) filtered by one or more of the following criteria: date codes in a certain calendar range; date codes within a certain product category; date codes collected in a certain time window; date codes violations (date codes have passed); and/or resolved date code violations.

In some configurations of shelf visualization, a backend system can stitch together the a representation of the shelf (Shelf Panorama) from individual SKU images (batch mode/ SKU Mapping). The visualization can be "clickable." For example, a user can click on a section of the image or a SKU, and a metadata pop up includes the date and time of when the image was taken, any user input from the time the image was taken, and/or status information. In some embodiments, the visualization is "zoomable," where a user can zoom into (e.g., enlarge a view of) a specific shelf location or SKU. The visualization can be searchable, where a user can type in a SKU number or product description and "fly" to the location/imagery of that product. When new scans/images of SKU's become available, an old image in the panorama is replaced with the new scans/images.

In some configurations, a dashboard or portal can include summary statistics and/or a timeline, which can include: average time between scans (average over all SKUs); PLV violations by day/week; out-of-stock events by day/week; total scans by day/week; and/or average time between scans (average over all SKUs).

In some configurations of a backend, a database can store data from a mobile device (e.g., data listed above, including historical data); be future proof for new structured data (e.g., quantity in stock); and/or allow querying of the database by SKU, shelf, aisle, etc. In some embodiments, the backend can be used to access a product database, for example public databases, web databases, a retailer's database, or a manufacturers database. Metadata can be added to every shelf, starting with shelf category (e.g., beverages, cereals, etc.). Filtering/querying can also be allowed by parameter (e.g., shelf ID, store ID, user ID, etc.). In some embodiments, a backend process can be used to determine an out-of-stock situation from the collected images. For security and authentication, an application (e.g., API and/or database) can be multi-tenant capable (3-10 pilot customers), where data uploaded by one customer is accessible/query-able only by the one customer. A unique configuration ID can be used to differentiate uploads. Also, in some embodiments, no business sensitive information (e.g., prices, item positions, etc.) is stored in cloud databases (e.g., to assure maximum privacy and data security).

Some configurations of an API or other interfaces include an internal API for sending data to and from a mobile device and/or the Cloud. For example, in-store data collected by the mobile device can be uploaded to the cloud; and/or a product database and be downloaded from the Cloud by the mobile device, with the possibility to select only certain columns (e.g., price and SKU columns). An external API for customers to query a backend database can include an API endpoint to query scans of one shelf inside a specific store (e.g., this endpoint returns only the latest scan and no historical data; /{store}/{shelf}); an API endpoint to update the product database; a possibility for the backend database to export in-store data to a CSV (comma-separated values) format; secure APIs; allow a customer to export CSV format; and/or allow a query by historical data (e.g., by a timespan).

Using systems and/or methods disclosed herein, the following can be accomplished: establishment and/or maintenance of a visual catalogue; SKU-specific and SKU-independent out-of-stock detection; price-label verification (PLV); simultaneous mapping and PLV; and/or OCR, and/or barcode decoding in web browser. Images can be captured in several ways, including: mobile cameras at the shelf, drones, robots, fixed shelf cameras, and simultaneous image capture with mobile barcode scans.

Some embodiments disclosed relate to methods and/or systems for operating an information system that aggregates pricing information from retail establishments. More particularly, and without limitation, some embodiments relate to acquiring imaging data of an object using an imaging tool, acquiring pricing information from signage using an imaging tool, acquiring inventory information of a product using an imaging tool, acquiring information from a receipt using an imaging tool, using predictive algorithms to reconstruct pricing information, incorporating available pricing information from publicly available sources, incorporating pricing information from issuing recommendations as to where to purchase a product, presenting information to one or more third parties, issuing recommendations as to which product to purchase based on available alternatives, operating a retail store, and adjusting prices based on information about competitive prices. Systems or methods can include: scanning products to image pricing labels at a retail display or shelf; using a drone to scan products at the shelf; using a robot to scan product at a shelf; using a consumer device to scan products and/or pricing at a display; scanning and/or parsing a shopping receipt to record the pricing of the products purchased; parsing a digital receipt to record the pricing of products purchased; and/or scanning and interpreting signage to infer pricing and special offers.

In some embodiments, a system to detect the state of a retail display comprises: a mobile data collector enabled with web browser software; a camera module; labels with optical codes collocated with the objects on display; and/or one or more processors that receive the identity of at least one object in one or more images captured by the camera module, receive the price on display of at least one object in one or more images captured by the camera module, receive the intended price of the at least one object from a database, and/or compare the price on display with the intended price and report the result. A system can comprise: a mobile data collector enabled with a web browser software; a camera module; labels with optical codes collocated with the objects on display; and/or one or more processors that receive the identity of at least one object in one or more images captured by the camera module, decode information about the object on display from the one or more images captured by the camera module, and/or compute a map of the at least one object on display from the one or more images captured by the camera module. A system can comprise: a mobile data collector; a camera module; labels with optical codes collocated with the objects on display; and/or one or more processors that receive the identity of at least one object in one or more images captured by the camera module, receive image data about the display area from the one or more images captured by the camera module, and/or detect the presence of the at least one objects in the display area from the one or more images captured by the camera module. A system can comprise: a mobile data collector; a camera module; labels with optical codes collocated with the objects on display; and/or one or more processors that receive the identity of at least one object in one or more images captured by the camera module, receive image data of the display area from the one or more images captured by the camera module, detect the presence of the at least one objects in the display area from the one or more images captured by the camera module, and/or save the image data of the one or more objects along with the identity of the one or more objects to a database.

Super Fast Scanning

A mobile device (e.g., a smartphone; a tablet) can be used for super-fast scanning of optical codes. In some configurations, the mobile device uses a wide-angle lens (e.g., for close up and better depth of field with a fixed focus—without AF delays), high frames per second (e.g., for speed and/or redundancy), very short exposure time (e.g., for avoidance of motion blur), and a torch (e.g., for additional lighting and/or aiming).

Figure 13:
FIG. 13 is an embodiment of a mobile device rapidly scanning optical patterns.

FIG. 13 is an embodiment of a mobile device 1300 rapidly scanning optical patterns 1304. The optical patterns 1304 can be codes 104 in FIG. 1. In some embodiments, super-fast scanning, or rapid scanning, refers to acquiring an image, detecting an optical code, and decoding the optical code in less than 0.25 seconds and/or equal to or greater than 0.002 seconds.

The mobile device 1300 comprises a camera, a display, and one or more processors. The camera comprises an image sensor and a lens. The lens is configured to focus light on the image sensor. The one or more processors are configured to acquire a plurality of images, analyze the plurality of images to detect an optical pattern in the plurality of images; decode the optical pattern to obtain a data payload; and save the data payload in a memory device of the mobile device.

A normal lens is a lens having a focal length about equal to a diagonal measurement of the image sensor. A normal lens has an angle of view of approximately 58° (e.g., measured diagonally), similar to an angle of view of a human eye. A wide-angle lens has an angle of view greater than a normal lens. The lens of the camera of the mobile device 1300 is a wide-angle lens. In some embodiments, the lens is an ultra-wide angle lens (e.g., having an angle of view equal to or greater than 100, 120, or 125 degrees and/or equal to or less than 128, 130, 150, or 180 degrees). For example, the lens has an angle of view of 128 degrees. The greater the depth of field of the camera, the greater the distance from the mobile device 1300 to the optical pattern 1304 can vary with a set focus. In some configurations, a camera with a 13 mm focal length (120 degree angle of view), 2.4 aperture, and sensor size 1/3.6 inches is used.

The lens of the camera is set at a fixed focus during the acquisition of the plurality of images. The lens set at the fixed focus could be a single focus lens, or the lens could be a variable focus lens with an autofocus feature disabled (e.g., the focus is set to a specific, predetermined value between 0 and 1). A single focus lens does not have a variable focus. The lens of the camera is set at the fixed focus during image acquisition so that an application for decoding optical patterns does not wait for a focus algorithm to run. Auto focus can cause delays in scanning. However, some fixed focus settings have a small depth of field. Using a wider angle lens, or wider zoom setting, can increase the depth of field.

An exposure time for each of the plurality of images is equal to or less than one five-hundredth of a second. The exposure time is short to reduce motion blur. ISO (the sensitivity of the sensor of the camera; sometimes referred to as film speed or gain) can be manually set (e.g., auto exposure is turned off) or controlled (e.g., adjusted) by the camera. For certain camera models, the inventors have found that an exposure of $1/750$ second is particularly beneficial for good exposure of optical patterns 1304 under various conditions while using a light on the mobile device (e.g., the "torch" or "flashlight"). Automatic metering often uses the 18% gray standard. For detecting and decoding optical patterns 1304, the metering can be stopped down 1, 2, 3, or more stops. The camera can automatically adjust the ISO, depending on how much light is available. In some embodiments, the exposure is equal to or faster than $1/500$ and/or equal to or slower than a maximum shutter speed of the camera (e.g., $1/2000$ or $1/8000$). Choosing an exposure can be important because some phone models do not like to expose noisiness of an image, and thus limit gain adjustments. By selectively choosing an exposure (e.g., $1/750$ of a second), and/or using the torch, the plurality of images can be properly exposed over a variety of working conditions. In some embodiments, the torch is activated during the acquisition of the plurality of images, regardless of exposure metering of the camera.

The plurality of images are acquired at a frame rate of the camera. The frame rate is greater than thirty frames per second (fps). In some embodiments, the frame rate is equal to or greater than 30, 60, 90 fps and/or equal to or less than 120, 150, 180, or 240 fps. For example, the frame rate is set to 120 fps. At a high frame rate, many images are acquired of an optical code. If the optical code is unreadable in one frame (e.g., because there is glare caused by the torch on a plastic cover of the optical patter 1304), then there are other frames having the optical code, which can be used to decode the optical code (i.e., having more image frames containing the optical pattern 1304 provides redundancy).

Acquiring the plurality of images at a high frame rate, and processing the plurality of images, can be computationally intense. To reduce computation intensity, a restricted area of each image is scanned (e.g., processed) instead of the whole image. The restricted area can be used based on use-case. For example, the restricted area is centered on the camera frame and has a height equal to one-third the camera image frame height and a width equal to the width of the camera image frame. In some embodiments, the restricted area is centered in the frame, has a height equal to or less than 60%, 50%, 40%, or 33%; has a height equal to or greater than 25% or 33% the height of an image frame; and/or has a width equal to or greater than 50%, 66%, 75%, or 100% the width of the image frame. Limiting scanning to a restricted area in a center of an image can be beneficial for images acquired by an ultra-wide angle lens because distortion will be greater at edges of an image acquired by a wide-angle lens. In some embodiments, matrix scan is used to track codes instead of trying to decode codes in each frame. Tracking optical codes can be used to reduce computation (e.g., tracking codes instead of trying to decode the optical code in each frame).

In some embodiments, the mobile device 1300 comprises a torch. The torch is sometimes referred to as a flashlight. The torch is configured to emit light 1320. The torch can comprise a light-emitting diode. A torch lens can be used to direct, diffuse, and/or shape a beam of light emitted from the light-emitting diode.

Rapid scanning can be used to detect and decode many optical patterns 1304 in parallel (e.g., two or more optical patterns 1304 in one image frame) and/or in sequential order (e.g., a user moving the mobile device 1300 along a shelf in a grocery story (e.g., as depicted in FIG. 13). In FIG. 13, a first optical pattern 1304-1 and a second optical pattern 1304-2 are shown. As the user moves the mobile device 1300 along a shelf, the camera of the mobile device 1300 acquires a plurality of images. The plurality of images are analyzed to detect and decode the first optical pattern 1304-1 to obtain a first data payload and detect and decode the second optical pattern 1304-2 to obtain a second data payload. The first data payload and the second data payload are saved to memory of the mobile device 1300 and/or transmitted (e.g., wirelessly and/or through the Internet) to a remote hardware server.

Acquiring many images, processing many images, and using the torch can use battery and can be computationally intense. Accordingly, in some embodiments, the torch is activated, and/or the plurality of images are processed while receiving an indication of a user action. For example, while the user is touching the display of the mobile device with a finger (e.g., the display is a touch screen), the application enters a rapid scanning mode. In rapid scanning mode, the torch is turned on, the camera starts acquiring images, the frame rate of the camera is increased (e.g., to 120 fps), and/or the shutter speed is sped up (e.g., to 1/750 second). After the user removes the finger from the display, the application exits the rapid scanning mode. After exiting the rapid scanning mode, the torch is turned off, the frame rate is reduced and/or the camera turned off, and/or the shutter speed returns to normal (e.g., camera returns to auto exposure, with auto control of shutter speed). The torch value is constant during acquisition of the plurality of images (e.g., the torch doesn't flash off and on as when a camera is going to take a picture in a dark environment). By reducing the amount of time the application is in rapid scanning mode, battery usage and/or computational resources are reduced.

There are additional and/or other ways the application can enter and/or exit the rapid scanning mode. For example, a first double tap on the display triggers the application to enter rapid scanning mode, a single tap is used to select an optical code, and/or a second double tap is used to exit rapid scanning mode. A hardware button could be used to enter rapid scanning mode. For example, the hardware button could be on the mobile device (e.g., a volume button, a hidden button on a back of a phone, a home button, etc.) and/or integrated on a case of the mobile device. In some embodiments, a software button is used. For example, a rectangular icon with the word, "SCAN" is displayed on the screen of the mobile device. As long as the user touches the screen at a location where the rectangular icon is displayed, then the application enters the rapid scanning mode. In some embodiments, data from an inertial measurement unit (IMU) is used to enter and/or exit the rapid scanning mode. For example, sensor data from the IMU corresponding to a shake or finger tap could be used by the application as an indication to enter or exit the rapid scanning mode.

Figure 14:
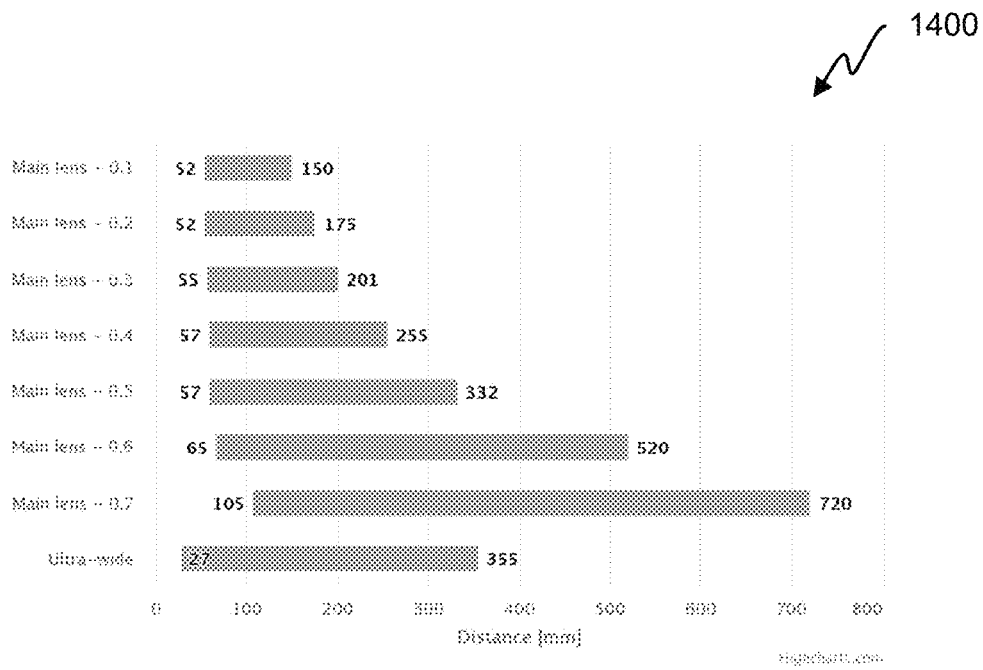
FIG. 14 depicts a chart showing scanning range as a function of camera focus setting for scanning a first type of barcode.

FIG. 14 depicts a chart 1400 showing scanning range as a function of camera focus setting for scanning a first type of barcode. The first type of barcode is an EAN13 barcode (e.g., wherein the thinnest element is 6 mil or 6 thousandths of an inch). Chart 1400 shows the scanning range (in millimeters) of an ultra-wide angle camera compared to a variable focus lens ("main lens") for different focus values. For example, the mobile device comprises two or more outward facing cameras (e.g., cameras facing in a direction not in line with, or 180 degrees from, a direction normal to a screen of the mobile device).

The ultra-wide angle camera has an angle of view of 128 degrees. The ultra-wide angle camera has a scanning range from 27 to 355 mm. The focus values of the main lens are between 0 and 1 (with steps of a tenth, wherein 0 (or 0%) is the closest plane and focus 1 (or 100%) is the farthest focus plane. The ultra-wide angle camera has a greater scanning range than the variable focus lens, while the focus value of the variable focus lens is between 0 and 0.5. At focus values of 0.6 and 0.7, the variable focus lens has a greater scanning range than the ultra-wide angle camera, 65 to 520 mm and 105 to 720 mm, respectively. However, the mobile device is farther away from the optical code to scan than the ultra-wide angle lens (e.g., 65 and 105 mm for the variable focal camera at focus values 0.6 and 0.7, compared to only 27 mm for the ultra-wide angle lens). While the difference might not seem much for the first type of barcode, the difference can be more pronounced for scanning different types of barcodes, as demonstrated in FIG. 15.

Figure 15:
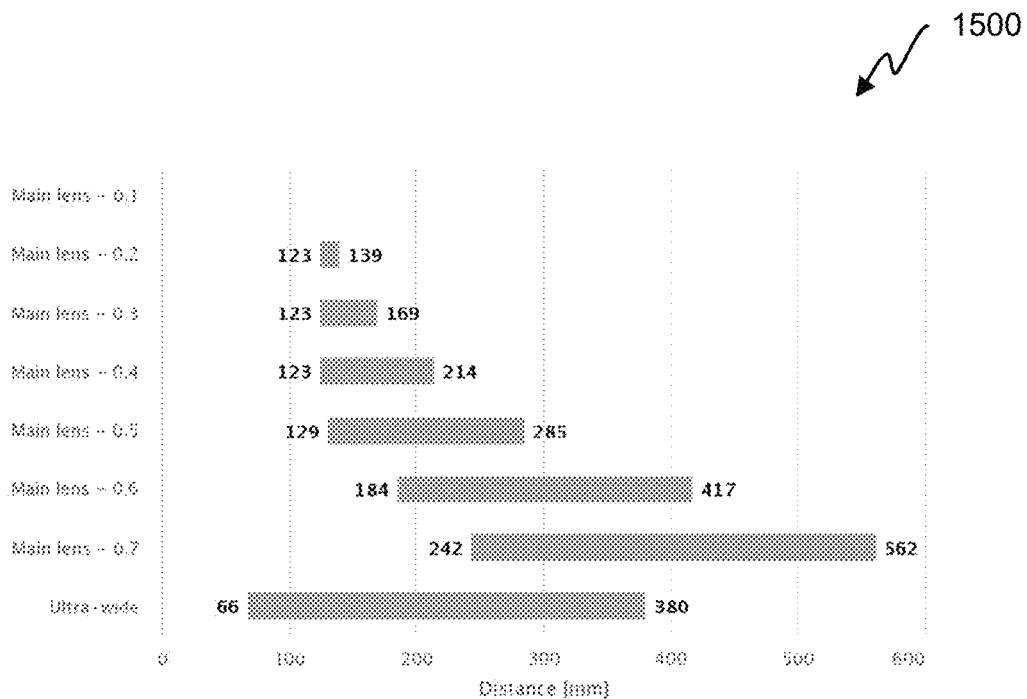
FIG. 15 depicts a chart showing scanning range as a function of camera focus setting for scanning a second type of barcode.

FIG. 15 depicts a chart 1500 showing scanning range as a function of camera focus setting for scanning a second type of barcode. The second type of barcode is a code 128 barcode (e.g., with the thinnest element 0.4 mm wide). Chart 1500 shows the scanning range of an ultra-wide angle camera compared to a variable focus lens ("main lens") for different focus values.

The ultra-wide angle camera has a scanning range from 66 to 380 mm. The scanning range is 184 to 417 mm for the main lens with a focus value of 0.6, and 242 to 562 mm for the main lens with a focus value of 0.7. Accordingly, scanning with the ultra-wide angle camera allows the mobile device to be much closer to the optical code than the main lens, while still providing a large scanning range. In some embodiments, an external lens (e.g., external to the mobile device) is used to provide an additional wide-angle lens (e.g., a lens with an angle of view equal to or greater than 100, 120, or 125 degrees). In some embodiments, the camera is configured to be equal to or greater than 0.025, 0.05, 0.06, or 0.1 meters away from an optical code and/or equal to or less than 0.5, 0.4, 0.3, 0.2, meters away from the optical code for decoding the optical code.

Figure 16:
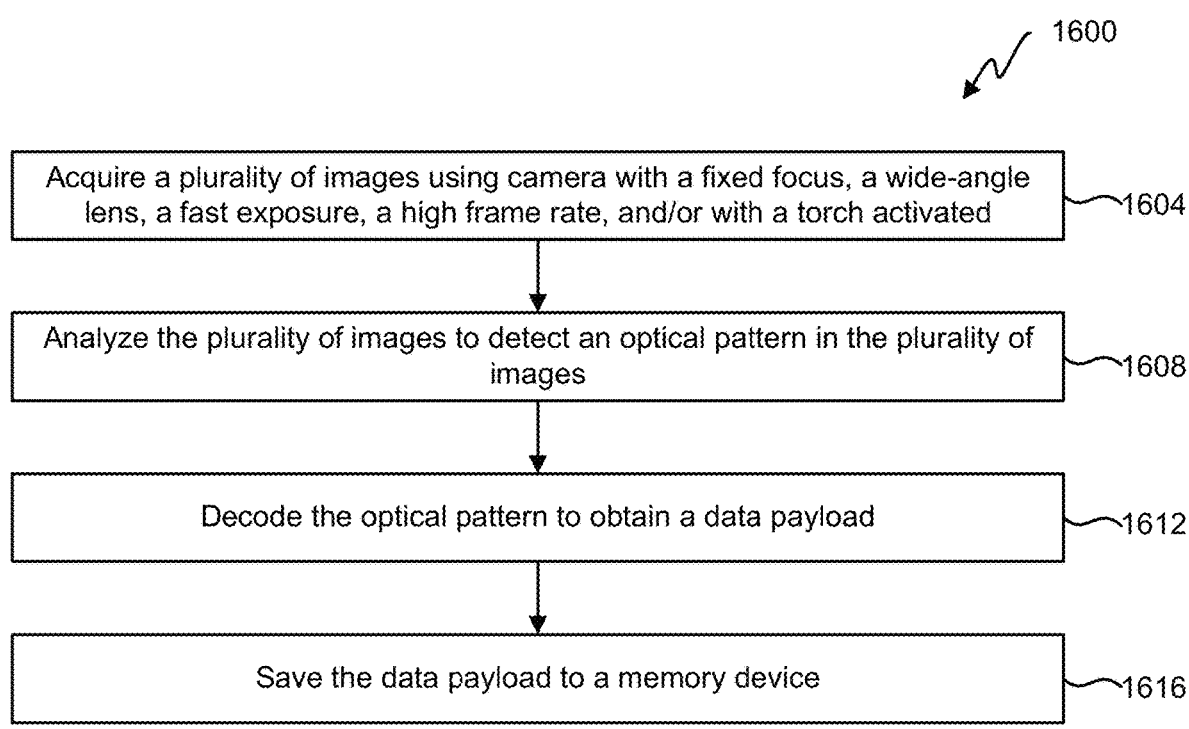
FIG. 16 illustrates a flowchart of an embodiment of a process for decoding optical patterns using a digital camera.

FIG. 16 illustrates a flowchart of an embodiment of a process 1600 for decoding optical patterns using a digital camera. Process 1600 begins in step 1604 with acquiring a plurality of images. The plurality of images are acquired using a camera with a fixed focus, a wide-angle lens, a fast exposure, a high frame rate, and/or with a torch activated. The lens of the camera is set at a fixed focus during acquisition of the plurality of images. For example, the lens is a single-focus lens or a variable focus lens set at a fixed value. The lens is a wide-angle lens (e.g., having an angle of view equal to or greater than 60 or 75 degrees) or an ultra-wide angle lens (e.g., having an angle of view equal to or greater than 90, 100, or 120 degrees). The exposure is fast. For example, the exposure time for each of the plurality of images is equal to or less than one 1/500, 1/750, or 1/1500 of a second. The camera has a high frame rate while acquiring the plurality of images. For example, the frame rate is equal to or greater than 30, 60, 90, or 120 frames per second.

In step 1608, the plurality of images are analyzed to detect an optical pattern in the plurality of images. For example, the plurality of images are analyzed for one, two, three or more optical patterns. An optical pattern can be a one-dimensional computer-readable optical code (e.g., a barcode), a two-dimensional computer-readable optical code (e.g., a QR code), and/or one or more symbols (e.g., letter, number, special character, and/or unique symbol).

In step 1612, the one or more optical patterns are decoded to obtain a data payload or data payloads. A data payload is data acquired by scanning an optical pattern. The data payload can comprise one or more letters, numbers, special characters, or other data. For example, three barcodes are decoded to obtain three numerical strings, one for each barcode. The three barcodes can be in one image frame and/or each barcode can be in separate image frames. The data payloads are then saved to memory, step 1616. A data payload can also be transmitted to a remote server.

In some embodiments, a torch (e.g., flashlight) of a mobile device is activated while acquiring the plurality of images. For example, the torch turns on as images are acquired by the camera, regardless if the exposure reading indicates that there is enough light to properly expose an image without the torch on. The torch can be used as an aimer. For example, the torch shines a beam of light. As the mobile device is brought close to an object comprising an optical code, the user can move the beam of light over the optical code. Images can be acquired of the optical code, and the optical code is decoded. High frames per second are used because light from the torch might cause glare (e.g., on plastic covering the optical code). Thus the high flow of frames increases the probability to acquire frames before or after the light from the torch shines directly on the optical code, which can be used to decode the optical code.

Mobile Device Attachment with External Lens

Figure 17:
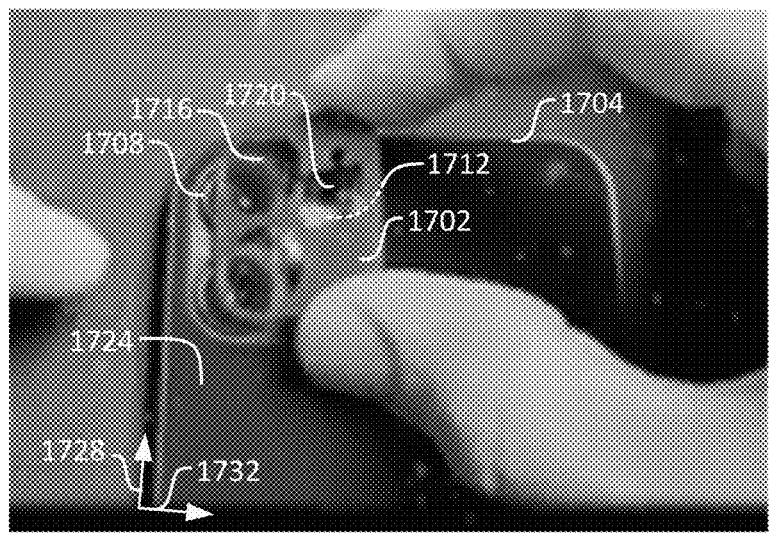
FIG. 17 is an embodiment of an attachment for a mobile device.

FIG. 17 is an embodiment of an attachment 1702 for a mobile device 1704. The attachment 1702 is an external attachment (e.g., the attachment 1702 is configured to be removably coupled with to the mobile device 1704). The mobile device 1704 comprises a camera. The camera comprises a first lens 1708. The mobile device 1704 comprises a torch 1712.

The attachment 1702 comprises a second lens 1716 and a third lens 1720. The second lens 1716 is configured to increase an angle of view of the camera of the mobile device 1704, while the attachment 1702 is coupled with the mobile device 1704. For example, the first lens 1708 could have an angle of view of 60 degrees, and the second lens 1716 increases the angle of view of the camera to 90, 100, or 120 degrees.

The third lens 1720 is configured to focus light of the torch 1712, while the attachment 1702 is coupled with the mobile device 1704. The third lens 1720 is configured to focus light of the torch 1712 in a direction normal from the torch (e.g., the third lens 1720 does not redirect the direction of an optical beam of light from the torch to a different angle). The direction normal of the torch 1712 is parallel to a normal vector of a back surface 1724 of the mobile device 1704. In some embodiments, the attachment 1702 comprises the third lens 1720 and does not comprise the second lens. In some configurations, the third lens 1720 is a Fresnel lens and/or made of plastic.

The torch 1712 can be used as an aimer for scanning optical codes. For example, light from the torch 1712 indicates where the camera of the mobile device 1704 is pointed. By focusing light from the torch 1712 (e.g., using the third lens 1720), light from the torch 1712 is concentrated into a tighter spot.

In some embodiments, the third lens 1720 is configured to focus light of the torch 1712 into an oblong shape (e.g., a rectangular shape or ellipse shape, wherein the ellipse shape is non-circular). The mobile device 1704 is commonly held by a user in a portrait orientation while scanning optical codes, such that a long side of the mobile device 1704 is substantially vertical, shown as the vertical direction 1728 in FIG. 17; and a short side of the mobile device is substantially horizontal, shown as the horizontal direction 1732 in FIG. 17. The direction normal of the back surface 1724 is orthogonal to both the vertical direction 1728 and the horizontal direction 1732 of the mobile device. The ellipse shape is configured such that a major axis of the ellipse is substantially parallel (e.g., plus or minus 1, 2, or 5 degrees) to the horizontal direction 1732 (e.g., in a direction of the short side of the mobile device 1704) and a minor axis substantially parallel (e.g., plus or minus 1, 2, or 5 degrees) to the vertical direction 1728 (e.g., in a direction of the long side of the mobile device 1704). Light of the torch 1712 is configured to be shaped into an ellipse or into a rectangle (e.g., with a long side of the rectangle substantially parallel to the horizontal direction 1732 and a short side of the rectangle substantially parallel to the vertical direction 1728) because optical codes are commonly oblong horizontally and a user can hold the mobile device 1704 in portrait orientation while scanning barcodes. The torch 1712 emitting light in an oblong shape can make it more intuitive for the user to use the torch as a pointer for scanning optical codes. In some embodiments, the major axis of the ellipse is aligned with the vertical direction 1728. The mobile device 1704 can be held sideways or in other orientations. For example, holding the mobile device 1704 in one hand, and scanning a code low down to the ground, the hand can be turned sideways so that the code is oriented along the long axis of the screen. By using the torch as an aimer, instead of using the screen, the mobile device can be held in such a way that a portion of the hand blocks the screen. This can be particularly useful for delivery drivers and transport/logistics personnel who scan many items (e.g., in a stack). This can save them from awkward maneuvering to scan with the mobile device 1704 in a vertical position (e.g., because they can just look at the orientation of the light from the torch instead of looking at the screen).

A width of the beam from the torch 1712 on a surface containing an optical code can also indicate to a user how close the mobile device 1704 should be held to the surface containing the optical code. For example, if the beam makes a large oval on the surface with the optical code, then the user moves the mobile device 1704 closer to the surface; and if the beam makes a small oval on the surface, then the user moves the mobile device 1704 farther away from the surface; so that the oval of light on the surface is about as large as the optical code. In certain configurations, the beam is configured to be focused to a width (e.g., measured horizontally) equal to or greater than half a width of an optical code and/or equal to or less than 2 or 3 times the width of the of the optical code while the code is within scanning range of the camera.

In some configurations, the attachment 1702 is a case for the mobile device 1704. The case can comprise the second lens 1716 and/or the third lens 1720; and the case can cover at least a portion of two or more sides of the mobile device 1704 (e.g., for protection). For example, the case could cover 80% or more of the back surface 1724 as well as cover portions of the long side(s) and/or the short side(s) of the mobile device 1704.

In some embodiments, the attachment 1702 (e.g., as a case) comprises a magnet. The magnet (e.g., in the case), can be used to secure the mobile device 1704 to an object (e.g., a metal cabinet) and/or to a wearable device (e.g., a belt, an armband, a chest pack, a leg band, a backpack, a fanny pack, etc.) of the user. By having the magnet, the mobile device 1704 can be placed so that the user can use two hands for another task. For example, a parcel-delivery person wears an armband around her upper arm. The mobile device 1704 is secured (e.g., magnetically attached) to the armband. The woman uses two hands to carry a package to a doorstep of a house for delivery, and she sets the package on the doorstep. After setting the package on the doorstep, she removes the mobile device 1704 from the armband and points the camera of the mobile device 1704 at a label on the package. She touches the screen of the mobile device with her thumb. While she touches the screen, the torch 1712 turns on, and the camera acquires a plurality of images. The plurality of images are analyzed and a barcode on the label of the package is decoded. A green box is overlaid on images presented on the screen to indicate to the user that the optical code has been decoded. The user then moves the mobile device backward and an image of the doorstep with the package is saved for verification of purchase. The user then removes her thumb from the screen. After the user removes her thumb, the torch turns off and the camera turns off or enters a standby mode. The user then places the mobile device on the armband and walks back to her vehicle. The barcode and the image of the doorstep are transmitted from the mobile device 1704 to a remote server. Since the barcode was decoded, the image of the doorstep is automatically linked to the barcode and saved to a file identified by the barcode.

Figure 18:
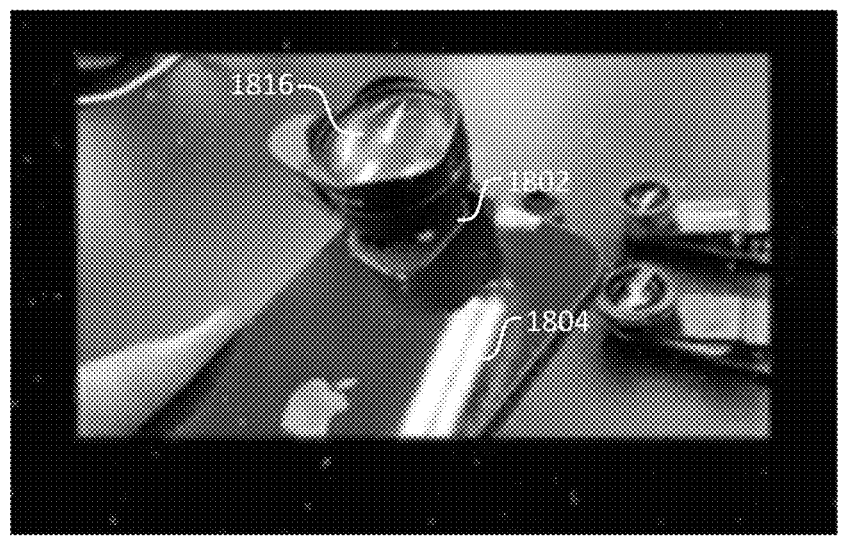
FIG. 18 is another embodiment of an attachment for a mobile device.

FIG. 18 depicts another embodiment of an attachment 1802 of a mobile device 1804. The attachment 1802 comprises a lens 1816. The lens 1816 is an ultra-wide angle lens (e.g., an angle of view equal to or greater than 120 degrees and/or equal to or less than 130, 150, 160, or 175 degrees). Some phone models do not have wide-angle lens, or a lens that has too narrow an angle of view (not wide enough angle lens). The lens 1816 can be attached to increase the angle of view of the camera of the mobile device 1804.

Sample Computing Device

Figure 19:
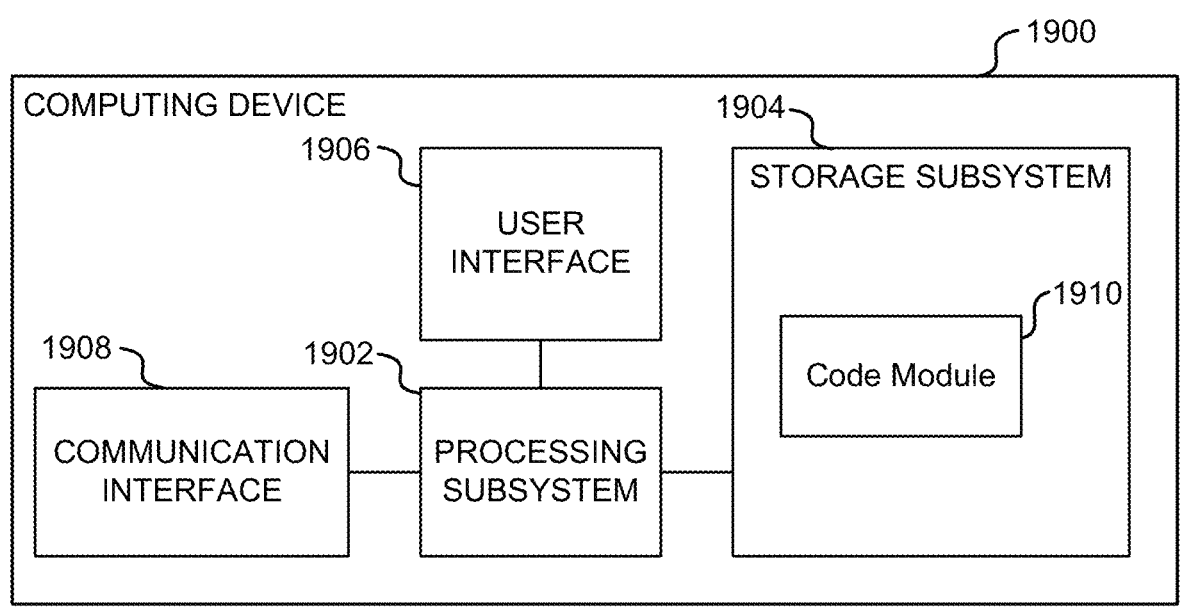
FIG. 19 depicts a block diagram of an embodiment of a computer system.

FIG. 19 is a simplified block diagram of a computing device 1900. Computing device 1900 can implement some or all functions, behaviors, and/or capabilities described above that would use electronic storage or processing, as well as other functions, behaviors, or capabilities not expressly described. Computing device 1900 includes a processing subsystem 1902, a storage subsystem 1904, a user interface 1906, and/or a communication interface 1908. Computing device 1900 can also include other components (not explicitly shown) such as a battery, power controllers, and other components operable to provide various enhanced capabilities. In various embodiments, computing device 1900 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 1904 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 1904 can store one or more applications and/or operating system programs to be executed by processing subsystem 1902, including programs to implement some or all operations described above that would be performed using a computer. For example, storage subsystem 1904 can store one or more code modules 1910 for implementing one or more method steps described above.

A firmware and/or software implementation may be implemented with modules (e.g., procedures, functions, and so on). A machine-readable medium tangibly embodying instructions may be used in implementing methodologies described herein. Code modules 1910 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 1910) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 1910 may comprise sets of instructions (codes) embodied on a computer-readable medium that directs a processor of a computing device 1900 to perform corresponding actions. The instructions may be configured to run in sequential order, in parallel (such as under different processing threads), or in a combination thereof. After loading a code module 1910 on a general purpose computer system, the general purpose computer is transformed into a special purpose computer system.

Computer programs incorporating various features described herein (e.g., in one or more code modules 1910) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 1904 can also store information useful for establishing network connections using the communication interface 1908.

User interface 1906 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 1906 to invoke the functionality of computing device 1900 and can view and/or hear output from computing device 1900 via output devices of user interface 1906. For some embodiments, the user interface 1906 might not be present (e.g., for a process using an ASIC).

Processing subsystem 1902 can be implemented as one or more processors (e.g., integrated circuits, one or more single-core or multi-core microprocessors, microcontrollers, central processing unit, graphics processing unit, etc.). In operation, processing subsystem 1902 can control the operation of computing device 1900. In some embodiments, processing subsystem 1902 can execute a variety of programs in response to program code and can maintain multiple concurrently executing programs or processes. At a given time, some or all of a program code to be executed can reside in processing subsystem 1902 and/or in storage media, such as storage subsystem 1904. Through programming, processing subsystem 1902 can provide various functionality for computing device 1900. Processing subsystem 1902 can also execute other programs to control other functions of computing device 1900, including programs that may be stored in storage subsystem 1904.

Communication interface 1908 can provide voice and/or data communication capability for computing device 1900. In some embodiments, communication interface 1908 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 1908 can provide wired connectivity (e.g., universal serial bus, Ethernet, universal asynchronous receiver/transmitter, etc.) in addition to, or in lieu of, a wireless interface. Communication interface 1908 can be implemented using a combination of hardware (e.g., driver circuits, antennas, modulators/demodulators, encoders/decoders, and other analog and/or digital signal processing circuits) and software components. In some embodiments, communication interface 1908 can support multiple communication channels concurrently. In some embodiments the communication interface 1908 is not used.

It will be appreciated that computing device 1900 is illustrative and that variations and modifications are possible. A computing device can have various functionality not specifically described (e.g., voice communication via cellular telephone networks) and can include components appropriate to such functionality.

Further, while the computing device 1900 is described with reference to particular blocks, it is to be understood that these blocks are defined for convenience of description and are not intended to imply a particular physical arrangement of component parts. For example, the processing subsystem 1902, the storage subsystem, the user interface 1906, and/or the communication interface 1908 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Electronic devices described herein can be implemented using computing device 1900.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. An apparatus for decoding optical patterns, the apparatus comprising:
 a camera comprising:
  an image sensor; and
  a lens configured to focus light on the image sensor, wherein the lens is a wide-angle lens; and
 one or more processors configured to:
  acquire a plurality of images using the camera, wherein:
   the lens is set at a fixed focus during acquisition of the plurality of images;
   an exposure time for each of the plurality of images is equal to or less than one five-hundredth of a second;
   the plurality of images are acquired at a frame rate of the camera; and
   the frame rate is equal to or greater than thirty frames per second;
  analyze the plurality of images to detect an optical pattern in the plurality of images;

decode the optical pattern to obtain a data payload; and
save the data payload in a memory device of the apparatus.

2. The apparatus of claim 1, wherein the lens is a single-focus lens.

3. The apparatus of claim 1, further comprising a torch, wherein the one or more processors are configured to activate the torch during the acquisition of the plurality of images.

4. The apparatus of claim 3, wherein the torch is configured to turn on while a user touches a screen on the apparatus with a finger and turn off based on the user removing the finger from the screen.

5. The apparatus of claim 3, wherein the torch has a constant value during the acquisition of the plurality of images.

6. The apparatus of claim 1, wherein the plurality of images are configured to be acquired while a user touches a screen of the apparatus with a finger.

7. The apparatus of claim 6, wherein the camera stops acquiring the plurality of images based on the user removing the finger from the screen.

8. The apparatus of claim 1, wherein the camera has an angle of view equal to or greater than 100 degrees.

9. A method for decoding optical patterns, the method comprising:
acquiring a plurality of images using a camera, wherein:
a lens of the camera is set at a fixed focus during acquisition of the plurality of images;
the lens of the camera is a wide-angle lens;
an exposure time for each of the plurality of images is equal to or less than one five-hundredth of a second;
the plurality of images are acquired at a frame rate of the camera; and
the frame rate is equal to or greater than thirty frames per second;
analyzing the plurality of images to detect an optical pattern in the plurality of images;
decoding the optical pattern to obtain a data payload; and
saving the data payload to a memory device.

10. The method of claim 9, wherein the plurality of images are acquired while a user touches a screen of an apparatus with a finger, wherein the apparatus comprises the camera.

11. The method of claim 10, wherein the camera stops acquiring the plurality of images based on the user removing the finger from the screen.

12. The method of claim 11, wherein a torch turns on while the user touches the screen on the apparatus with the finger and turns off based on the user removing the finger from the screen.

13. The method of claim 9, wherein the lens is a variable-focus lens with autofocus disabled, during acquisition of the plurality of images.

14. The method of claim 9, the exposure time is set to a specific value, and the camera adjusts an ISO of the camera during acquisition of the plurality of images.

15. The method of claim 9, further comprising tracking a position of the optical pattern before decoding the optical pattern.

16. The method of claim 9, wherein:
the optical pattern is a first optical pattern;
the data payload is a first data payload; and
the method further comprises:
analyzing the plurality of images for a second optical pattern;
decoding the second optical pattern to obtain a second data payload; and
saving the second data payload to the memory device.

17. The method of claim 9, wherein the exposure time is equal to or greater than $1/650$ of a second and equal to or less than $1/1000$ of a second.

18. The method of claim 9, wherein the frame rate is equal to or greater than 120 fps.

19. The method of claim 9, wherein the plurality of images are acquired at a distance equal to or greater than 0.02 meters and equal to or less than 0.5 meters from the optical pattern.

20. A memory device comprising instructions that, when executed, cause one or more processors to perform the following steps for decoding an optical codes:
acquiring a plurality of images using a camera, wherein:
a lens of the camera is set at a fixed focus during acquisition of the plurality of images;
the lens of the camera is a wide-angle lens;
an exposure time for each of the plurality of images is equal to or less than one five-hundredth of a second;
the plurality of images are acquired at a frame rate of the camera; and
the frame rate is equal to or greater than thirty frames per second;
analyzing the plurality of images to detect an optical pattern in the plurality of images;
decoding the optical pattern to obtain a data payload; and
saving the data payload.

21. The memory device of claim 20 wherein the instructions, when executed, cause the one or more processors to transmit the data payload to a remote hardware server.

* * * * *